(12) United States Patent
Hammond, Jr. et al.

(10) Patent No.: US 11,767,060 B2
(45) Date of Patent: Sep. 26, 2023

(54) LIGHTWEIGHT VEHICLE

(71) Applicant: Textron Inc., Providence, RI (US)

(72) Inventors: Donny Lee Hammond, Jr., Augusta, GA (US); Sam Dean Smith, Martinez, GA (US); Trevor Douglas Roebuck, Evans, GA (US); Landon Niles Ball, North Augusta, SC (US)

(73) Assignee: TEXTRON INNOVATIONS INC., Providence, RI (US)

( * ) Notice: Subject to any disclaimer, the term of this patent is extended or adjusted under 35 U.S.C. 154(b) by 320 days.

(21) Appl. No.: 16/383,041

(22) Filed: Apr. 12, 2019

(65) Prior Publication Data

US 2020/0324817 A1    Oct. 15, 2020

(51) Int. Cl.
| | | |
|---|---|---|
| *B62D 21/02* | (2006.01) | |
| *B60G 7/00* | (2006.01) | |
| *B62D 21/11* | (2006.01) | |
| *B60G 3/20* | (2006.01) | |
| *B60G 21/055* | (2006.01) | |

(52) U.S. Cl.
CPC ............... *B62D 21/02* (2013.01); *B60G 3/20* (2013.01); *B60G 7/001* (2013.01); *B62D 21/11* (2013.01); *B60G 21/055* (2013.01); *B60G 2200/30* (2013.01)

(58) Field of Classification Search
CPC ...... B62D 21/02; B62D 21/11; B62D 63/025; B62D 25/20; B60G 7/001; B60G 3/20; B60G 2200/30; B60G 21/055; B60G 2300/13; B60G 2202/112; B60G 2300/50; B60G 11/04; B60G 2200/142; B60G 2200/1324; B60G 3/06; B60G 3/10
See application file for complete search history.

(56) References Cited

U.S. PATENT DOCUMENTS

| | | | | |
|---|---|---|---|---|
| 862,556 | A * | 8/1907 | Handy ................... | B60G 11/14 267/248 |
| 1,282,389 | A * | 10/1918 | Dodge ............... | B62D 49/0692 180/321 |
| 2,085,738 | A * | 7/1937 | Coleman ................ | B60G 15/12 280/124.156 |
| 2,138,438 | A * | 11/1938 | Wagner ................... | B60G 3/20 280/124.179 |

(Continued)

OTHER PUBLICATIONS

Garia Luxury Golf Car [retrieved May 1, 2019] from the internet: <URL http://www.garia.com/models/leisure/monaco/monaco/.

*Primary Examiner* — Paul N Dickson
*Assistant Examiner* — Timothy Wilhelm
(74) *Attorney, Agent, or Firm* — Sandberg Phoenix von Gontard PC

(57) ABSTRACT

A universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The rear suspension system is connected to the main vehicle chassis structure such that when the one or more rear wheel assembly is mounted to the rear suspension system a rear wheel of the one or more rear wheel assembly defines the distal end of an overall length of the vehicle.

17 Claims, 21 Drawing Sheets

(56) References Cited

U.S. PATENT DOCUMENTS

| | | | | |
|---|---|---|---|---|
| 2,344,072 A * | 3/1944 | Winkelmann | B60G 21/05 | 267/281 |
| RE22,955 E * | 12/1947 | Penney | B60P 1/283 | 298/22 R |
| 2,481,943 A * | 9/1949 | Murphy | B61D 33/005 | 297/238 |
| 2,607,301 A * | 8/1952 | Lundvall | B61D 17/10 | 52/664 |
| 2,643,897 A * | 6/1953 | Chowning | B60G 3/20 | 280/124.179 |
| 2,942,893 A * | 6/1960 | Nallinger | B60G 3/24 | 280/124.156 |
| 3,237,968 A * | 3/1966 | Arsenault | B62K 5/025 | 280/411.1 |
| 3,254,734 A * | 6/1966 | Behrmann | B60G 11/08 | 280/775 |
| 3,282,365 A * | 11/1966 | McReynolds | B62D 61/08 | 180/209 |
| 3,388,761 A * | 6/1968 | Arpin | B62D 61/08 | 280/278 |
| 3,554,310 A * | 1/1971 | Dieffenbach | B62D 55/06 | 180/9.23 |
| 3,598,385 A * | 8/1971 | Parsons, Jr. | B60G 21/05 | 280/124.141 |
| 3,743,047 A * | 7/1973 | Dapolito | B60T 7/12 | 188/110 |
| 3,877,671 A * | 4/1975 | Underwood | B61D 45/002 | 410/97 |
| 4,105,084 A * | 8/1978 | Baak | B62B 5/0026 | 180/21 |
| 4,278,143 A * | 7/1981 | Nagai | B60T 7/045 | 188/111 |
| 4,336,964 A * | 6/1982 | Pivar | B62K 5/027 | 296/78.1 |
| 4,373,743 A * | 2/1983 | Parsons, Jr. | B62D 17/00 | 280/86.757 |
| 4,422,685 A * | 12/1983 | Bonfilio | B62D 65/04 | 296/193.04 |
| 4,533,013 A * | 8/1985 | Hightower | B62K 5/027 | 280/DIG. 5 |
| 4,541,654 A * | 9/1985 | Jonasson | B60N 2/2863 | 297/483 |
| 4,589,678 A * | 5/1986 | Lund | B60G 21/005 | 280/5.511 |
| 4,631,891 A * | 12/1986 | Donavich | B62D 25/2054 | 296/204 |
| 4,730,870 A * | 3/1988 | DeRees | B62D 63/025 | 296/192 |
| 4,749,211 A * | 6/1988 | Kosuge | B62K 5/01 | 180/908 |
| 4,798,255 A * | 1/1989 | Wu | B60L 50/66 | D12/128 |
| 4,842,326 A * | 6/1989 | DiVito | B60P 3/42 | 296/10 |
| 4,883,287 A * | 11/1989 | Murakami | B60G 3/265 | 280/124.135 |
| 4,930,591 A * | 6/1990 | Lanius | B62D 31/003 | 280/DIG. 5 |
| 4,946,193 A * | 8/1990 | Oka | B62K 7/04 | 180/908 |
| 5,064,209 A * | 11/1991 | Kurschat | A61G 5/1089 | 280/502 |
| 5,154,251 A * | 10/1992 | Fought | B62K 5/025 | 280/DIG. 5 |
| 5,401,056 A * | 3/1995 | Eastman | B62D 47/006 | 296/193.03 |
| 5,498,018 A * | 3/1996 | Wahl | B60G 3/26 | 280/124.138 |
| 5,538,274 A * | 7/1996 | Schmitz | F16F 1/38 | 280/124.135 |
| 5,560,651 A * | 10/1996 | Kami | B60K 13/04 | 180/311 |
| 5,568,959 A * | 10/1996 | Weber | B60N 2/757 | 297/238 |
| 5,623,878 A * | 4/1997 | Baxter | A63G 21/08 | 104/53 |
| 5,722,724 A * | 3/1998 | Takei | B60N 2/3084 | 297/238 |
| 5,727,642 A * | 3/1998 | Abbott | A63B 71/0009 | 280/DIG. 5 |
| 5,820,150 A * | 10/1998 | Archer | F16F 1/38 | 280/124.141 |
| 5,821,434 A * | 10/1998 | Halliday | B60G 17/019 | 73/862.541 |
| 5,921,338 A * | 7/1999 | Edmondson | B60K 20/04 | 280/124.111 |
| 5,934,397 A * | 8/1999 | Schaper | B62D 63/025 | 180/65.245 |
| 5,961,088 A * | 10/1999 | Chabanne | B60N 2/073 | 248/429 |
| 6,036,201 A * | 3/2000 | Pond | F16F 9/06 | 280/5.514 |
| 6,050,593 A * | 4/2000 | McConnell | B62K 5/025 | 280/287 |
| 6,056,077 A * | 5/2000 | Kobayashi | B62K 5/007 | 280/786 |
| 6,059,058 A * | 5/2000 | Dower | B60L 50/52 | 180/65.265 |
| D427,109 S * | 6/2000 | Molzon | D12/1 | |
| 6,099,072 A * | 8/2000 | Sturt | B60N 2/3075 | 296/65.09 |
| 6,105,594 A * | 8/2000 | Diaz | A45B 17/00 | 135/88.03 |
| 6,126,050 A * | 10/2000 | Aliano, Jr. | A63B 55/00 | 206/315.3 |
| 6,142,253 A * | 11/2000 | Mueller | B62K 11/10 | 180/908 |
| 6,145,910 A * | 11/2000 | Baldas | B60N 2/01583 | 296/65.01 |
| 6,145,913 A * | 11/2000 | Odagaki | B60N 2/01583 | 296/65.13 |
| 6,223,865 B1 * | 5/2001 | Lang | B60T 11/18 | 188/73.31 |
| 6,238,166 B1 * | 5/2001 | Collier | B60P 1/14 | 414/469 |
| 6,257,081 B1 * | 7/2001 | Gagnon | B60W 10/11 | 74/483 PB |
| 6,293,610 B1 * | 9/2001 | Howard | A63B 55/60 | 180/908 |
| 6,293,616 B1 * | 9/2001 | Williams | B60K 37/00 | 296/210 |
| 6,343,666 B1 * | 2/2002 | Olson | B62M 27/02 | 180/190 |
| 6,378,637 B1 * | 4/2002 | Ono | H01M 50/20 | 180/68.5 |
| 6,378,881 B2 * | 4/2002 | Stenvall | B60G 11/12 | 280/124.171 |
| 6,394,555 B2 * | 5/2002 | Mizuta | B62D 33/02 | 298/17 R |
| 6,457,729 B2 * | 10/2002 | Stenvall | B60G 11/08 | 280/124.171 |
| 6,457,765 B1 * | 10/2002 | Bergquist | B64C 1/20 | 296/65.09 |
| 6,467,783 B1 * | 10/2002 | Blondelet | B60G 3/20 | 280/5.521 |
| 6,557,882 B2 * | 5/2003 | Harrington | B60D 1/143 | 280/415.1 |
| 6,565,105 B2 * | 5/2003 | Lin | B60G 9/02 | 280/124.113 |
| 6,626,260 B2 * | 9/2003 | Gagnon | B60K 15/01 | 180/908 |
| 6,631,775 B1 * | 10/2003 | Chaney | B60L 53/80 | 280/783 |
| 6,648,105 B2 * | 11/2003 | Lang | B60T 7/045 | 188/73.31 |
| 6,688,616 B1 * | 2/2004 | Ziech | B62D 17/00 | 280/86.753 |

(56) References Cited

U.S. PATENT DOCUMENTS

| | | | | |
|---|---|---|---|---|
| 6,692,051 B1 * | 2/2004 | Cook | B60N 2/24 | |
| | | | 296/24.39 | |
| 6,722,455 B2 * | 4/2004 | Hurlburt | B62D 61/10 | |
| | | | 180/56 | |
| 6,727,962 B2 * | 4/2004 | Adams | B60K 37/02 | |
| | | | 349/61 | |
| 6,767,022 B1 * | 7/2004 | Chevalier | B62K 5/01 | |
| | | | 280/124.136 | |
| 6,796,407 B2 * | 9/2004 | Buckley | B60T 1/065 | |
| | | | 188/359 | |
| 6,799,781 B2 * | 10/2004 | Rasidescu | B62K 5/027 | |
| | | | 280/786 | |
| 6,830,117 B2 * | 12/2004 | Chernoff | B60G 17/015 | |
| | | | 296/35.3 | |
| 6,843,336 B2 * | 1/2005 | Chernoff | B60G 17/015 | |
| | | | 296/35.3 | |
| 6,863,288 B2 * | 3/2005 | Van Den Brink | B62D 9/02 | |
| | | | 280/124.103 | |
| 6,866,110 B2 * | 3/2005 | Mallette | B62J 35/00 | |
| | | | 280/124.134 | |
| 6,905,159 B1 * | 6/2005 | Saito | B60N 2/305 | |
| | | | 296/65.09 | |
| 6,916,142 B2 * | 7/2005 | Hansen | B60P 1/00 | |
| | | | 298/17 T | |
| 6,923,282 B2 * | 8/2005 | Chernoff | B60L 50/66 | |
| | | | 180/65.265 | |
| 6,929,083 B2 * | 8/2005 | Hurlburt | B62D 31/006 | |
| | | | 296/181.7 | |
| D511,317 S * | 11/2005 | Tanaka | D12/1 | |
| 6,968,917 B2 * | 11/2005 | Rondeau | B62J 7/06 | |
| | | | 180/908 | |
| 7,000,931 B1 * | 2/2006 | Chevalier | B60G 3/20 | |
| | | | 280/124.136 | |
| 7,004,484 B1 * | 2/2006 | Chevalier | B60G 7/02 | |
| | | | 280/124.136 | |
| 7,028,799 B2 * | 4/2006 | Lin | B62D 21/12 | |
| | | | 180/908 | |
| 7,036,848 B2 * | 5/2006 | Chernoff | B60G 7/003 | |
| | | | 280/782 | |
| 7,044,249 B2 * | 5/2006 | Fan | B62D 21/12 | |
| | | | 280/278 | |
| 7,048,296 B1 * | 5/2006 | Wu | B62B 3/12 | |
| | | | 280/DIG. 6 | |
| 7,059,441 B2 * | 6/2006 | Chen | B62D 21/12 | |
| | | | 180/215 | |
| 7,070,239 B1 * | 7/2006 | Ugrekhelidze | B60N 2/3084 | |
| | | | 297/238 | |
| 7,083,018 B2 * | 8/2006 | Luh | B60K 1/00 | |
| | | | 180/208 | |
| 7,083,176 B2 * | 8/2006 | Soles | B60G 7/02 | |
| | | | 280/86.751 | |
| 7,100,722 B2 * | 9/2006 | Bowen | H02P 7/298 | |
| | | | 180/65.51 | |
| 7,104,581 B2 * | 9/2006 | Chernoff | B60K 1/04 | |
| | | | 296/35.3 | |
| 7,121,623 B2 * | 10/2006 | Fujihara | B60N 2/01 | |
| | | | 297/452.21 | |
| 7,159,681 B1 * | 1/2007 | Sauve | B60N 2/305 | |
| | | | 180/208 | |
| 7,195,096 B1 * | 3/2007 | Mawhinney | G05G 1/487 | |
| | | | 180/315 | |
| 7,201,384 B2 * | 4/2007 | Chaney | B60L 53/80 | |
| | | | 280/783 | |
| 7,213,864 B2 * | 5/2007 | Gasper | B60J 7/10 | |
| | | | 296/144 | |
| 7,229,117 B2 * | 6/2007 | Okuda | B60N 2/3011 | |
| | | | 296/65.09 | |
| 7,234,557 B2 * | 6/2007 | Chen | B62K 15/00 | |
| | | | 280/638 | |
| 7,252,168 B2 * | 8/2007 | Lin | B62K 5/007 | |
| | | | 180/908 | |
| 7,252,318 B2 * | 8/2007 | Sumida | B60N 2/3045 | |
| | | | 296/64 | |
| 7,258,192 B2 * | 8/2007 | Davis | B60G 21/0551 | |
| | | | 180/312 | |
| 7,258,395 B2 * | 8/2007 | Bataille | B62D 21/183 | |
| | | | 296/35.1 | |
| D552,509 S | 10/2007 | Walkup et al. | | |
| 7,287,779 B2 * | 10/2007 | Miller | B62D 39/00 | |
| | | | 296/26.08 | |
| 7,287,797 B1 * | 10/2007 | Belloso | B62D 21/03 | |
| | | | 296/193.07 | |
| 7,303,033 B2 * | 12/2007 | Chernoff | B60L 50/66 | |
| | | | 296/205 | |
| 7,311,167 B2 * | 12/2007 | Takayanagi | B60G 21/007 | |
| | | | 180/215 | |
| 7,329,161 B2 * | 2/2008 | Roering | B60F 3/003 | |
| | | | 440/12.5 | |
| 7,331,270 B2 * | 2/2008 | Booher | F41H 5/0485 | |
| | | | 89/36.02 | |
| 7,347,490 B2 * | 3/2008 | Kobayashi | B62D 25/2009 | |
| | | | 296/63 | |
| 7,373,315 B2 * | 5/2008 | Chernoff | B60G 17/0195 | |
| | | | 705/26.1 | |
| 7,380,805 B1 * | 6/2008 | Turner | B60G 11/15 | |
| | | | 280/124.135 | |
| 7,401,675 B2 * | 7/2008 | Chang | B62K 5/025 | |
| | | | 180/68.5 | |
| 7,441,809 B1 * | 10/2008 | Coombs | B62D 65/04 | |
| | | | 280/781 | |
| 7,487,985 B1 * | 2/2009 | Mighell | B62K 5/027 | |
| | | | 280/124.126 | |
| 7,506,714 B2 * | 3/2009 | Davis | F16F 9/512 | |
| | | | 180/311 | |
| 7,506,718 B2 * | 3/2009 | Morita | F16H 57/025 | |
| | | | 180/374 | |
| 7,506,855 B2 * | 3/2009 | Frantz | B64C 1/20 | |
| | | | 244/118.6 | |
| 7,566,086 B2 * | 7/2009 | Gray | H04L 12/2859 | |
| | | | 296/65.13 | |
| 7,578,544 B1 * | 8/2009 | Shimamura | B62D 47/003 | |
| | | | 296/26.11 | |
| 7,585,010 B2 * | 9/2009 | Hardy | B60N 2/012 | |
| | | | 296/213 | |
| 7,588,010 B2 * | 9/2009 | Mochizuki | B60K 5/02 | |
| | | | 123/195 HC | |
| D605,555 S * | 12/2009 | Tanaka | D12/14 | |
| 7,637,338 B2 * | 12/2009 | Maltais | B62J 25/04 | |
| | | | 180/215 | |
| 7,661,689 B2 * | 2/2010 | Kinugasa | B60G 15/062 | |
| | | | 280/124.135 | |
| 7,686,379 B2 * | 3/2010 | Lemieux | B60R 13/0243 | |
| | | | 296/148 | |
| D613,644 S * | 4/2010 | Zhang | D12/16 | |
| 7,712,563 B2 * | 5/2010 | Niebuhr | B60L 53/80 | |
| | | | 180/311 | |
| 7,717,495 B2 * | 5/2010 | Leonard | B62D 25/10 | |
| | | | 180/311 | |
| 7,722,063 B2 * | 5/2010 | Dieziger | B62K 5/10 | |
| | | | 280/124.135 | |
| 7,762,603 B2 * | 7/2010 | Hyde | B60N 2/24 | |
| | | | 296/68.1 | |
| 7,866,422 B2 * | 1/2011 | Peters | B62D 63/025 | |
| | | | 296/190.04 | |
| 7,866,428 B1 * | 1/2011 | Oliver | A63B 55/61 | |
| | | | 280/771 | |
| 7,938,410 B2 * | 5/2011 | Buma | B60G 17/0165 | |
| | | | 280/5.509 | |
| 7,967,100 B2 | 6/2011 | Cover et al. | | |
| 8,020,658 B2 * | 9/2011 | Rajasingham | A61G 3/0808 | |
| | | | 180/209 | |
| 8,029,021 B2 * | 10/2011 | Leonard | B62D 55/04 | |
| | | | 180/21 | |
| 8,056,928 B2 * | 11/2011 | Ijaz | B60K 15/013 | |
| | | | 280/830 | |
| 8,079,602 B2 * | 12/2011 | Kinsman | B62D 21/14 | |
| | | | 280/5.512 | |

(56) References Cited

U.S. PATENT DOCUMENTS

| | | | |
|---|---|---|---|
| D652,349 S | 1/2012 | Kristensen | |
| 8,196,692 B2* | 6/2012 | Davis | B60G 21/0551 |
| | | | 180/312 |
| 8,240,748 B2* | 8/2012 | Chapman | B62D 23/005 |
| | | | 296/205 |
| 8,256,553 B2* | 9/2012 | De Paschoal | B60L 53/80 |
| | | | 180/68.5 |
| 8,286,745 B2* | 10/2012 | Kosco | B60N 2/544 |
| | | | 180/210 |
| 8,313,136 B2* | 11/2012 | Arnold | B60P 3/423 |
| | | | 296/64 |
| 8,328,261 B2* | 12/2012 | Kanazawa | B62D 33/08 |
| | | | 296/65.09 |
| 8,348,322 B2* | 1/2013 | King | B62D 47/003 |
| | | | 296/65.09 |
| 8,387,734 B2* | 3/2013 | Krosschell | B60N 2/38 |
| | | | 296/64 |
| 8,485,303 B2* | 7/2013 | Yamamoto | B60G 3/20 |
| | | | 180/311 |
| 8,485,541 B2* | 7/2013 | Pozio | B60G 3/20 |
| | | | 280/124.136 |
| 8,544,796 B2* | 10/2013 | Pozzi | B64D 11/0696 |
| | | | 244/118.6 |
| 8,579,310 B2* | 11/2013 | Tanaka | B60G 3/20 |
| | | | 280/124.135 |
| 8,596,652 B2* | 12/2013 | Tong | B62D 63/065 |
| | | | 180/220 |
| 8,613,335 B2* | 12/2013 | Deckard | F16H 57/027 |
| | | | 180/68.1 |
| 8,640,806 B2* | 2/2014 | Worup | B62D 63/025 |
| | | | 180/209 |
| 8,662,228 B2* | 3/2014 | Hill | B62K 5/10 |
| | | | 180/210 |
| RE44,854 E* | 4/2014 | Henderson | B62K 5/05 |
| | | | 280/771 |
| 8,696,051 B2* | 4/2014 | Charbonneau | B62D 25/025 |
| | | | 296/187.12 |
| 8,714,618 B1* | 5/2014 | Heit | B60P 3/423 |
| | | | 296/64 |
| 8,746,394 B2* | 6/2014 | Kuramoto | B60K 17/34 |
| | | | 180/292 |
| 8,752,879 B1* | 6/2014 | Heit | B60P 3/423 |
| | | | 296/39.1 |
| 8,870,206 B1* | 10/2014 | Bandy | B60G 3/20 |
| | | | 280/124.135 |
| 8,876,125 B1* | 11/2014 | Chan | B62K 5/007 |
| | | | 280/22 |
| 8,911,312 B2* | 12/2014 | Itoo | F16H 57/0489 |
| | | | 474/93 |
| 8,925,659 B2* | 1/2015 | Peters | B62D 47/003 |
| | | | 180/294 |
| 8,944,449 B2* | 2/2015 | Hurd | B62D 21/183 |
| | | | 280/124.152 |
| 8,973,254 B2* | 3/2015 | Droste | B60L 50/66 |
| | | | 29/730 |
| 8,973,701 B2* | 3/2015 | Holihan | F16H 59/0278 |
| | | | 74/552 |
| 9,039,060 B1* | 5/2015 | Yamamoto | B60N 2/36 |
| | | | 296/183.1 |
| 9,045,028 B2* | 6/2015 | Ichikawa | B60L 1/08 |
| 9,102,205 B2* | 8/2015 | Kvien | B60G 3/20 |
| 9,114,682 B1* | 8/2015 | Bandy | B62D 7/16 |
| 9,127,738 B2* | 9/2015 | Ellifson | F16F 9/063 |
| 9,187,023 B2* | 11/2015 | Takahashi | B60P 1/04 |
| 9,242,581 B2* | 1/2016 | Farooq | B60N 2/0224 |
| 9,327,621 B2* | 5/2016 | Oshima | B60N 2/3013 |
| 9,381,940 B2* | 7/2016 | Gale | B60G 21/073 |
| 9,393,894 B2* | 7/2016 | Steinmetz | B60N 2/012 |
| 9,394,014 B2* | 7/2016 | Girouard | B62D 55/065 |
| 9,434,412 B2* | 9/2016 | Clark | B66F 9/065 |
| 9,440,681 B2* | 9/2016 | Kuroda | B62D 23/005 |
| 9,440,690 B2* | 9/2016 | Manternach | B62D 53/02 |
| 9,481,265 B2* | 11/2016 | Moore | B60N 2/58 |
| 9,555,701 B2* | 1/2017 | Borowicz | B60K 17/08 |
| 9,555,702 B2* | 1/2017 | Olli | B60K 17/34 |
| 9,561,143 B2* | 2/2017 | Hoffmann | A61G 5/1086 |
| 9,637,026 B2* | 5/2017 | Cardone | B60N 2/245 |
| 9,637,190 B2* | 5/2017 | Pojidaev | E02F 3/96 |
| 9,643,527 B2* | 5/2017 | Uranaka | B60K 17/30 |
| 9,649,924 B2* | 5/2017 | Nakaoka | B60K 5/04 |
| 9,669,873 B2* | 6/2017 | Buschjohann | B62D 29/008 |
| 9,694,676 B2* | 7/2017 | Bandy | B60G 3/202 |
| 9,713,976 B2* | 7/2017 | Miller | B60K 11/06 |
| 9,719,591 B2* | 8/2017 | Wade | F04D 27/004 |
| 9,758,030 B2* | 9/2017 | Newman | B60L 50/64 |
| 9,764,639 B2* | 9/2017 | Park | A61F 4/00 |
| 9,771,112 B2* | 9/2017 | Spindler | B62D 23/005 |
| 9,845,004 B2* | 12/2017 | Hedlund | B60K 13/02 |
| 9,845,123 B2* | 12/2017 | Byrnes | B60L 50/60 |
| 9,863,523 B2* | 1/2018 | Stocks | F16H 9/14 |
| 9,889,777 B2* | 2/2018 | Proulx | B60N 2/38 |
| 10,017,037 B2* | 7/2018 | Newman | B60L 50/64 |
| 10,040,501 B2* | 8/2018 | Haines | B62J 17/08 |
| 10,066,728 B2* | 9/2018 | Yolitz | F16H 57/0006 |
| 10,081,290 B2* | 9/2018 | Fohrenkamm | A01B 51/02 |
| 10,086,891 B2* | 10/2018 | Hung | B60L 50/60 |
| 10,131,381 B2* | 11/2018 | Ashraf | B62D 63/025 |
| 10,155,442 B2* | 12/2018 | Gong | B62D 29/008 |
| 10,160,498 B1* | 12/2018 | Ezra | B62D 21/20 |
| 10,207,554 B2* | 2/2019 | Schroeder | B60G 7/005 |
| 10,207,555 B2* | 2/2019 | Mailhot | B60R 21/13 |
| 10,232,882 B2* | 3/2019 | Bertezzolo | B62D 21/12 |
| 10,239,562 B2* | 3/2019 | Kotrla | B62D 25/02 |
| 10,266,052 B2* | 4/2019 | Vermeersch | G05G 1/00 |
| 10,272,759 B2* | 4/2019 | Sudhindra | B60L 50/64 |
| 10,442,264 B2* | 10/2019 | Mailhot | B60G 7/008 |
| 10,545,509 B1* | 1/2020 | Jessen | B62D 63/025 |
| 10,562,409 B2* | 2/2020 | Kadiu | B60N 2/0732 |
| 10,569,663 B2* | 2/2020 | Webb | B60L 53/80 |
| 10,583,818 B2* | 3/2020 | Chang | B60T 13/662 |
| 10,625,867 B2* | 4/2020 | Hildom | B64D 11/0648 |
| 10,632,857 B2* | 4/2020 | Matecki | H01M 50/249 |
| 10,632,951 B2* | 4/2020 | Nusier | B62D 25/20 |
| 10,633,028 B2* | 4/2020 | Winter | B60K 1/00 |
| 10,766,533 B2* | 9/2020 | Houkom | B62D 21/11 |
| 10,946,707 B2* | 3/2021 | Hisamura | B62D 21/11 |
| 11,088,412 B2* | 8/2021 | Matecki | B60K 1/04 |
| 11,121,427 B1* | 9/2021 | Bustamante Laparra | B60L 50/64 |
| 11,148,517 B2* | 10/2021 | Hammond, Jr. | B60K 1/04 |
| 11,155,150 B2* | 10/2021 | Stephens | B62D 25/2036 |
| 11,211,656 B2* | 12/2021 | Matecki | B60K 1/04 |
| 11,331,994 B2* | 5/2022 | Handing | B60K 1/04 |
| 2001/0024046 A1* | 9/2001 | Mizuta | B62D 33/037 |
| | | | 296/57.1 |
| 2002/0175007 A1* | 11/2002 | Strong | E02F 9/0841 |
| | | | 180/54.1 |
| 2003/0019684 A1* | 1/2003 | Wucherpfennig | B60N 2/14 |
| | | | 180/330 |
| 2003/0046802 A1* | 3/2003 | Chernoff | B60K 15/07 |
| | | | 29/428 |
| 2003/0085064 A1* | 5/2003 | Turner | B60K 7/0007 |
| | | | 180/65.51 |
| 2003/0192726 A1* | 10/2003 | Chu | A61G 5/0891 |
| | | | 180/65.51 |
| 2004/0021286 A1* | 2/2004 | Bombardier | B60G 3/06 |
| | | | 280/124.134 |
| 2004/0026146 A1* | 2/2004 | Mallette | B62J 35/00 |
| | | | 280/124.134 |
| 2004/0031639 A1* | 2/2004 | Deves | B62D 33/03 |
| | | | 180/311 |
| 2004/0178600 A1* | 9/2004 | Wagner | B60G 3/18 |
| | | | 280/124.135 |
| 2004/0206568 A1* | 10/2004 | Davis | B60G 21/0551 |
| | | | 180/311 |
| 2004/0227321 A1* | 11/2004 | Kuroki | B60G 21/05 |
| | | | 280/124.135 |
| 2005/0017469 A1* | 1/2005 | Hill | B62B 3/144 |
| | | | 280/47.38 |

(56) References Cited

U.S. PATENT DOCUMENTS

| | | | | |
|---|---|---|---|---|
| 2005/0072613 A1* | 4/2005 | Maltais | ................. | B62M 27/02 |
| | | | | 180/182 |
| 2005/0077098 A1* | 4/2005 | Takayanagi | ............. | B62K 5/10 |
| | | | | 180/215 |
| 2005/0140160 A1* | 6/2005 | Arias | ...................... | B60P 3/423 |
| | | | | 296/64 |
| 2005/0179242 A1* | 8/2005 | Chernoff | ................ | B62D 31/00 |
| | | | | 280/781 |
| 2005/0279541 A1* | 12/2005 | Peters | ..................... | B60L 50/52 |
| | | | | 180/65.1 |
| 2006/0032692 A1* | 2/2006 | Ima | ........................ | B60K 23/08 |
| | | | | 180/249 |
| 2006/0086553 A1* | 4/2006 | Chen | ...................... | B62K 15/00 |
| | | | | 180/208 |
| 2006/0103126 A1* | 5/2006 | Miller | ..................... | B62D 31/00 |
| | | | | 296/26.08 |
| 2006/0169549 A1* | 8/2006 | Lang | ..................... | F16D 55/228 |
| | | | | 188/73.1 |
| 2006/0180383 A1* | 8/2006 | Bataille | ................ | B62D 21/183 |
| | | | | 180/311 |
| 2006/0283645 A1* | 12/2006 | Lin | ........................ | B62D 21/12 |
| | | | | 180/209 |
| 2007/0057526 A1* | 3/2007 | Bigelow | .............. | B60N 2/3095 |
| | | | | 296/65.03 |
| 2007/0089929 A1* | 4/2007 | Schriewer | ............. | A01M 31/02 |
| | | | | 182/127 |
| 2007/0090621 A1* | 4/2007 | Vigen | ..................... | B60G 7/02 |
| | | | | 280/124.113 |
| 2007/0108712 A1* | 5/2007 | Ryan | .................... | B60G 15/067 |
| | | | | 280/124.1 |
| 2007/0219030 A1* | 9/2007 | Ho | ...................... | F16H 57/0489 |
| | | | | 474/144 |
| 2008/0017426 A1* | 1/2008 | Walters | ................... | B60F 3/003 |
| | | | | 296/193.04 |
| 2008/0100018 A1* | 5/2008 | Dieziger | .................. | B60G 3/20 |
| | | | | 280/124.135 |
| 2009/0008890 A1* | 1/2009 | Woodford | ................ | B60G 3/20 |
| | | | | 280/124.113 |
| 2009/0194961 A1* | 8/2009 | Dieziger | ................. | B62K 5/01 |
| | | | | 280/124.103 |
| 2010/0133019 A1* | 6/2010 | Muemken | ........... | B62D 21/186 |
| | | | | 180/9.21 |
| 2010/0263948 A1* | 10/2010 | Couture | ............... | B62D 55/075 |
| | | | | 180/9.1 |
| 2012/0193163 A1* | 8/2012 | Wimpfheimer | .......... | B60G 3/20 |
| | | | | 180/311 |
| 2012/0217715 A1* | 8/2012 | Ehrlich | ................ | B60G 21/051 |
| | | | | 280/124.128 |
| 2013/0038082 A1* | 2/2013 | Bertocchi | ............ | B60N 2/0284 |
| | | | | 296/65.05 |
| 2013/0206496 A1* | 8/2013 | Hashimoto | ............ | B62D 21/12 |
| | | | | 180/291 |
| 2013/0241228 A1* | 9/2013 | Nakamura | ........... | B62D 33/037 |
| | | | | 296/26.08 |
| 2013/0270864 A1* | 10/2013 | Young | ...................... | B60K 1/04 |
| | | | | 296/187.12 |
| 2014/0292039 A1* | 10/2014 | Kuroda | ................... | B60R 21/13 |
| | | | | 296/203.01 |
| 2014/0332298 A1* | 11/2014 | Girouard | ................ | B62M 27/02 |
| | | | | 180/9.42 |
| 2015/0268010 A1* | 9/2015 | Strauss | ................. | F41H 5/0478 |
| | | | | 89/36.02 |
| 2016/0207418 A1* | 7/2016 | Bergstrom | .............. | B60L 50/64 |
| 2017/0088231 A1* | 3/2017 | Williams | ................. | B62K 5/06 |
| 2017/0341590 A1* | 11/2017 | McLauchlan | ........... | B60R 9/042 |
| 2018/0126871 A1* | 5/2018 | Martinotti | ............ | B62D 31/025 |
| 2018/0326843 A1* | 11/2018 | Danielson | ............ | B60G 15/062 |
| 2019/0241037 A1* | 8/2019 | Hays | ....................... | B60B 19/00 |
| 2020/0155386 A1* | 5/2020 | Kumar | ................. | A61G 3/0808 |
| 2021/0179189 A1* | 6/2021 | Noh | ................... | B60N 2/01508 |

* cited by examiner

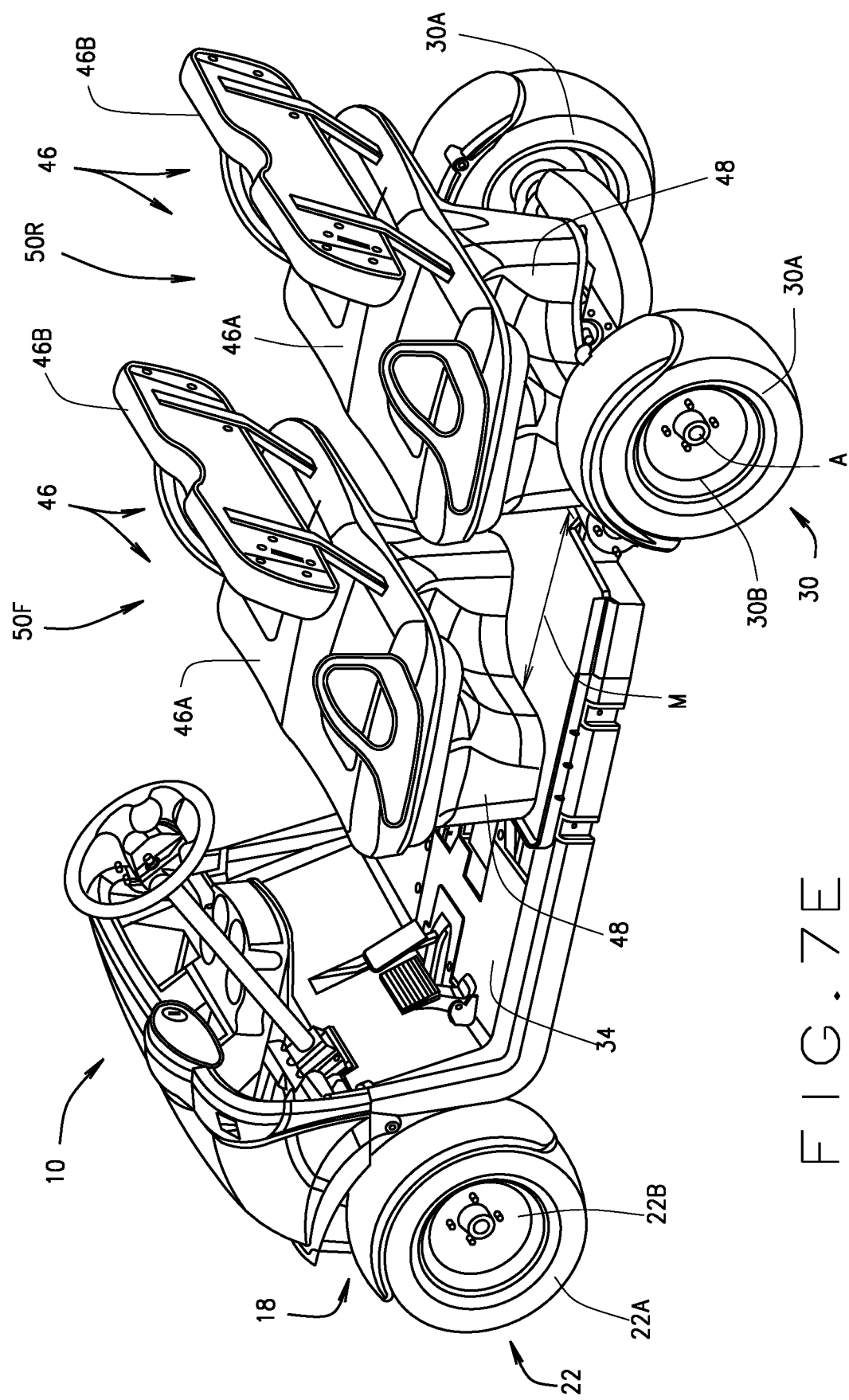

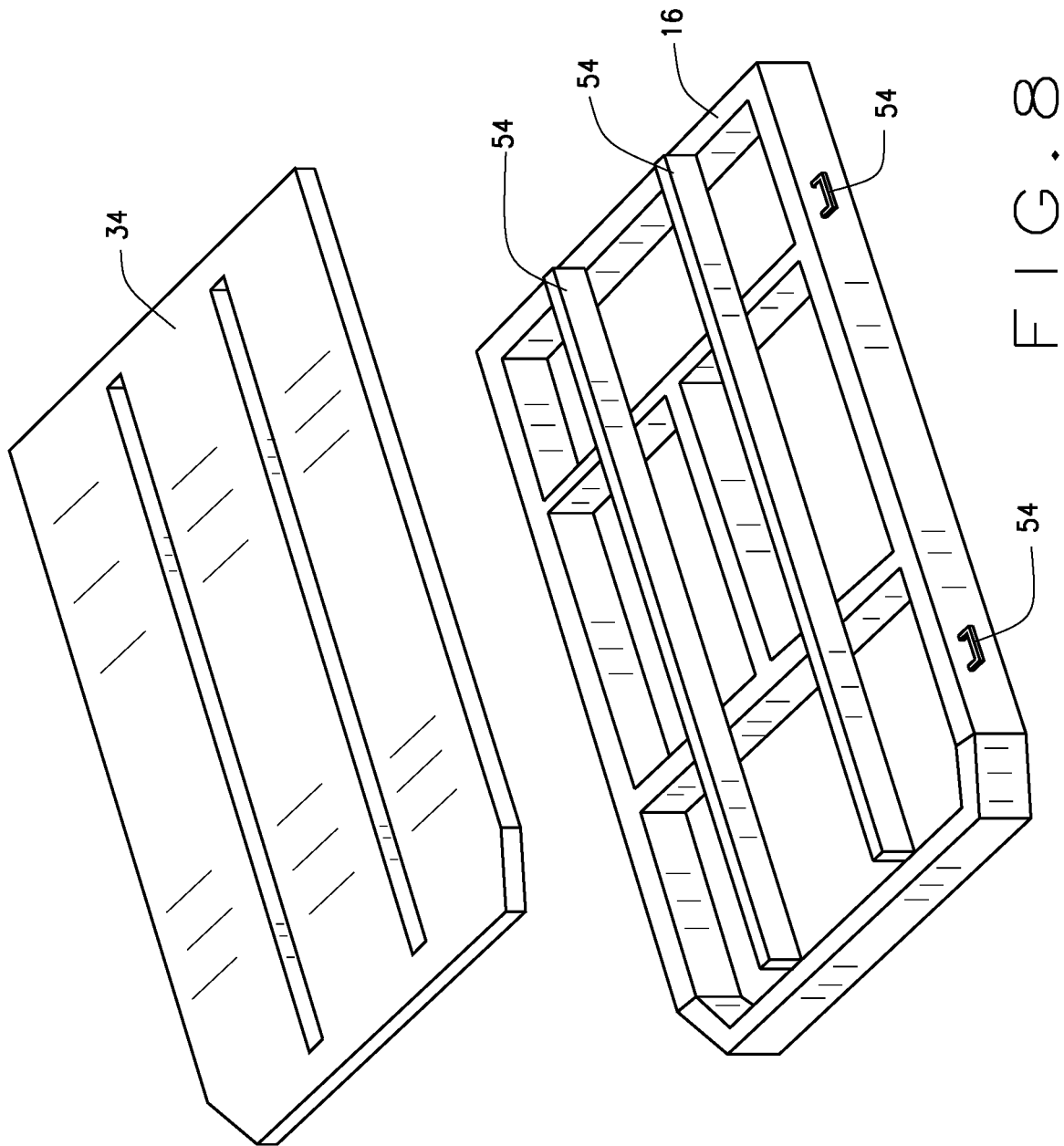

LIGHTWEIGHT VEHICLE

CROSS-REFERENCE TO RELATED APPLICATIONS

The present application is related in general subject matter to U.S. application Ser. No. 16/383,073, filed by the Applicant of the present application on Apr. 12, 2019. Said application is assigned to the same assignee as the present application, is being filed concurrently with the present application, and is hereby incorporated by reference in its entirety into the present application

FIELD

The present teachings relate to lightweight vehicles, and to a universal assembly platform that can be selectively outfitted to construct a variety of different lightweight vehicles.

BACKGROUND

The statements in this section merely provide background information related to the present disclosure and may not constitute prior art.

Lightweight vehicles are quite capable in a wide variety of riding environments and situations, whether for sport or utility purposes. The ability of the vehicles to carry multiple occupants makes them socially enjoyable to ride as well. The vehicles can be easy to enter and exit and easy to operate with controls and ergonomics somewhat similar to automobiles. While lightweight vehicles commonly have seating for multiple passengers, it may be desirable to improve the seating layout from known vehicles.

SUMMARY

In various embodiments, the present disclosure provides a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension systems are connected to the main vehicle chassis structure such that when the one or more wheel assembly is mounted to the front and/or rear suspension system, the front distal end of the front tire is longitudinally forward of the universal assembly platform and the rear distal end of the rear tire is longitudinally rearward of the universal assembly platform. In various instances a rear wheel of the one or more rear wheel assembly defines the distal end of an overall length of the vehicle.

In various embodiments, the present disclosure provides a lightweight vehicle that comprises a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension system are connected to the main vehicle chassis structure such that when the one or more wheel assembly is mounted to the front and/or rear suspension system the front distal end of the front tire is longitudinally forward of the universal assembly platform and the rear distal end of the rear tire is longitudinally rearward of the universal assembly platform. In various instances a rear wheel of the one or more rear wheel assembly defines the distal end of an overall length of the vehicle. The vehicle further comprises one or more forward facing seating structure. In various embodiments, the rearmost forward facing structure is connected to the universal assembly platform such that it is positioned over the rear suspension.

In various embodiments, the present disclosure provides a lightweight vehicle that comprises a universal assembly platform for lightweight vehicles, wherein the platform comprises a main vehicle chassis structure, a front suspension system connected to the main vehicle chassis structure and to which one or more front wheel assembly is mountable, and a rear suspension system connected to the main vehicle chassis structure and to which one or more rear wheel assembly is mountable. The front and rear suspension system are connected to the main vehicle chassis structure such that when the one or more rear wheel assembly is mounted to the front and/or rear suspension system the front distal end of the front tire is forward of the universal assembly platform and the rear distal end of the rear tire is rearward of the universal assembly platform. In various instances a rear wheel of the one or more rear wheel assembly defines the distal end of an overall length of the vehicle. The lightweight vehicle further comprises a prime vehicle mover operably connected to one or more wheel assemblies for moving the vehicle over ground. In various embodiments, the lightweight vehicle additionally comprises a front row forward facing seating structure, and a rear row forward facing seating structure that is disposed directly above the rear suspension system.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

Figure 3A:
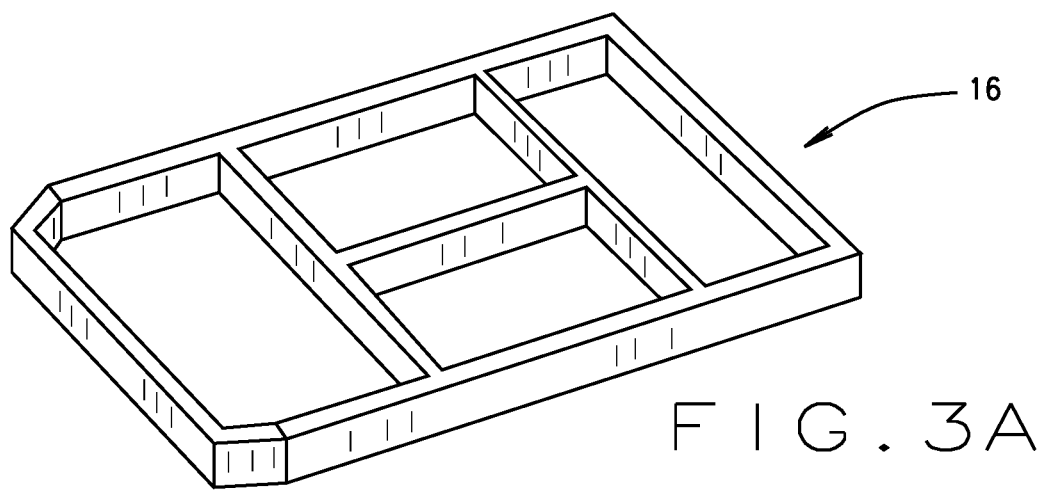
FIGS. 3A through 3C are illustrations of exemplary chassis that can be utilized as a chassis for the universal assembly platform shown in FIGS. 1A, 1B and 2, in accordance with various embodiments of the present disclosure.
Figure 3B:
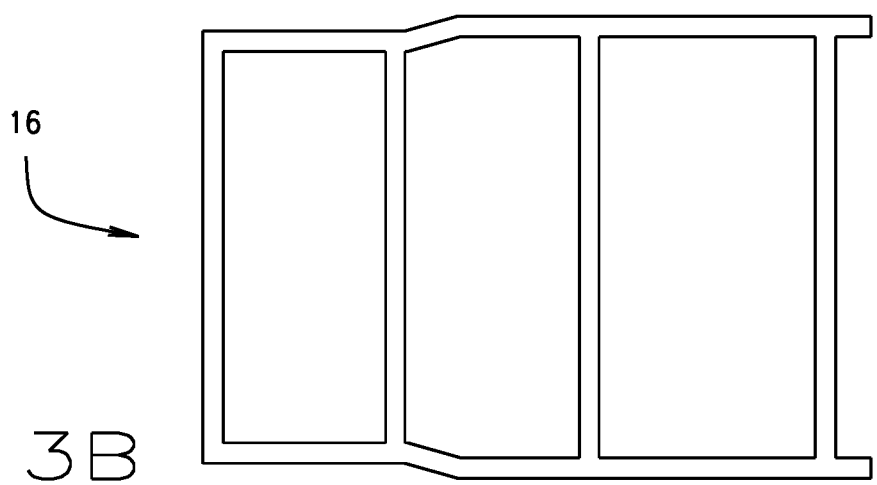
Figure 3C:
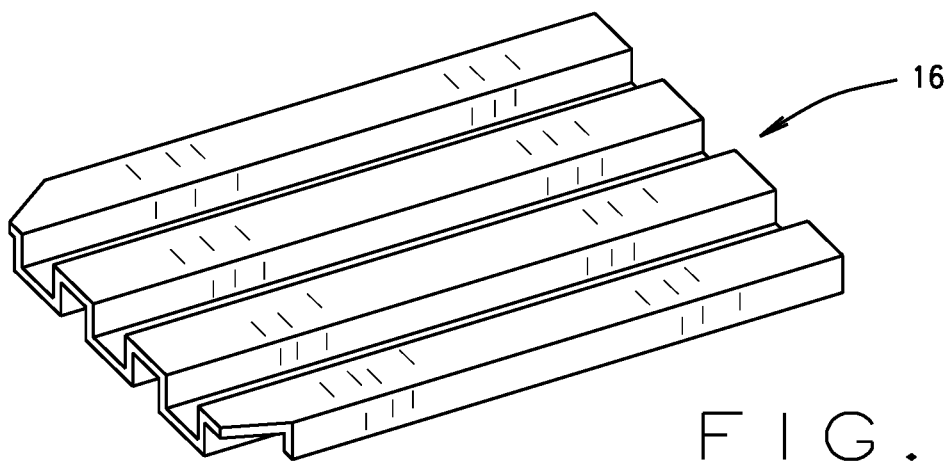
Figure 4A:
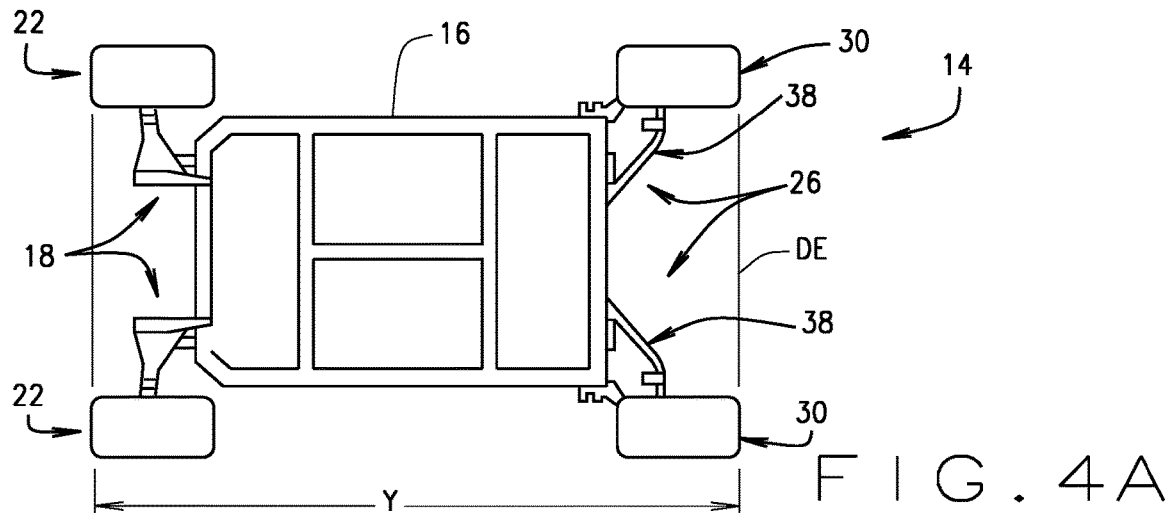
Figure 4B:
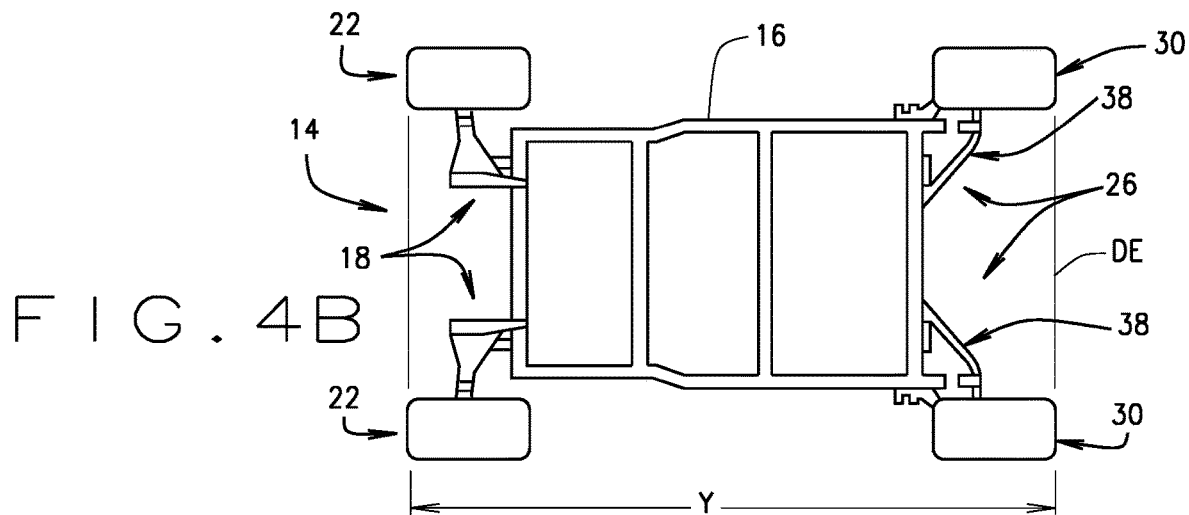
Figure 4C:
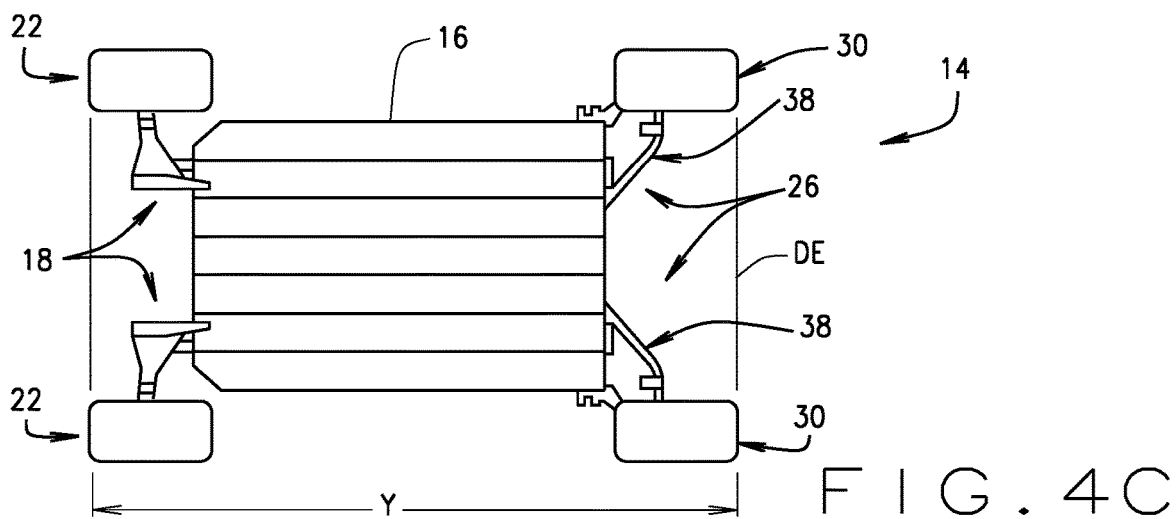

FIGS. 4A through 4C are illustrations of exemplary universal assembly platforms that comprise the exemplary chassis shown in FIGS. 3A through 3C and includes a rear suspension system comprising a pair independent rear suspension assemblies having rear wheel assemblies mounted thereto, and also includes a front suspension system comprising a pair independent front suspension assemblies having front wheel assemblies mounted thereto, in accordance with various embodiments of the present disclosure.

Figure 5A:
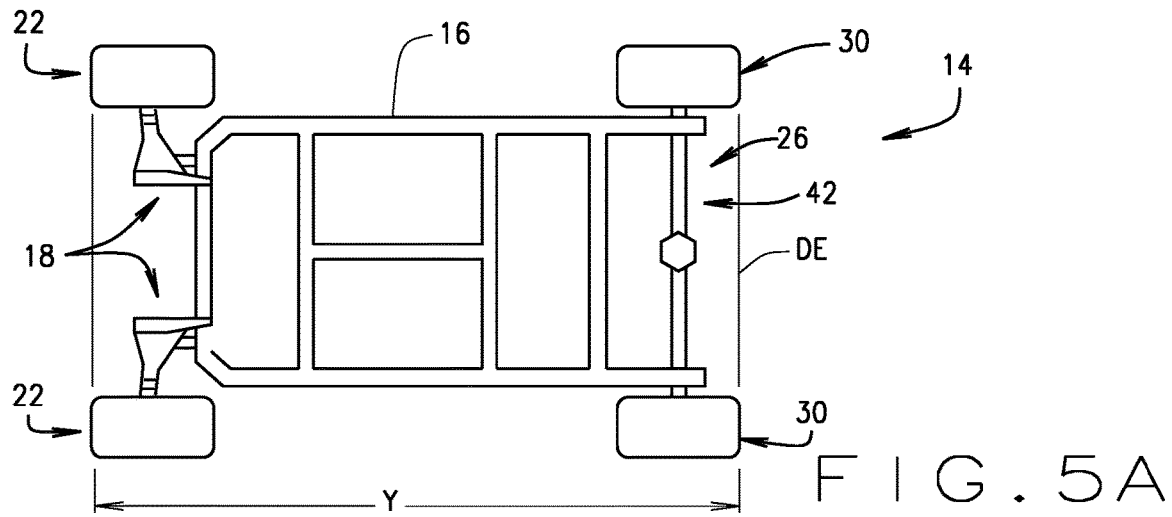
Figure 5B:
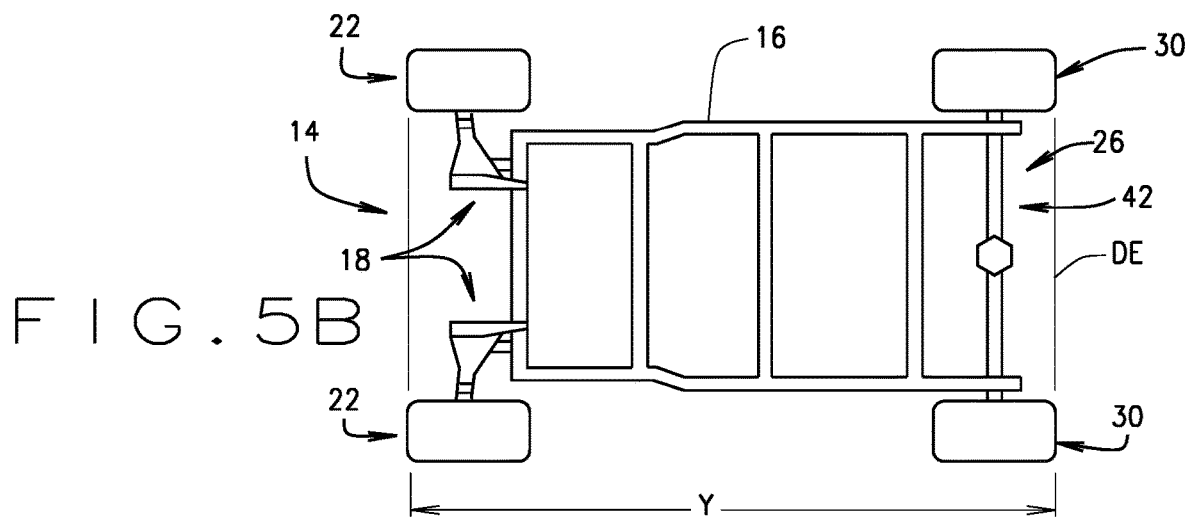
Figure 5C:
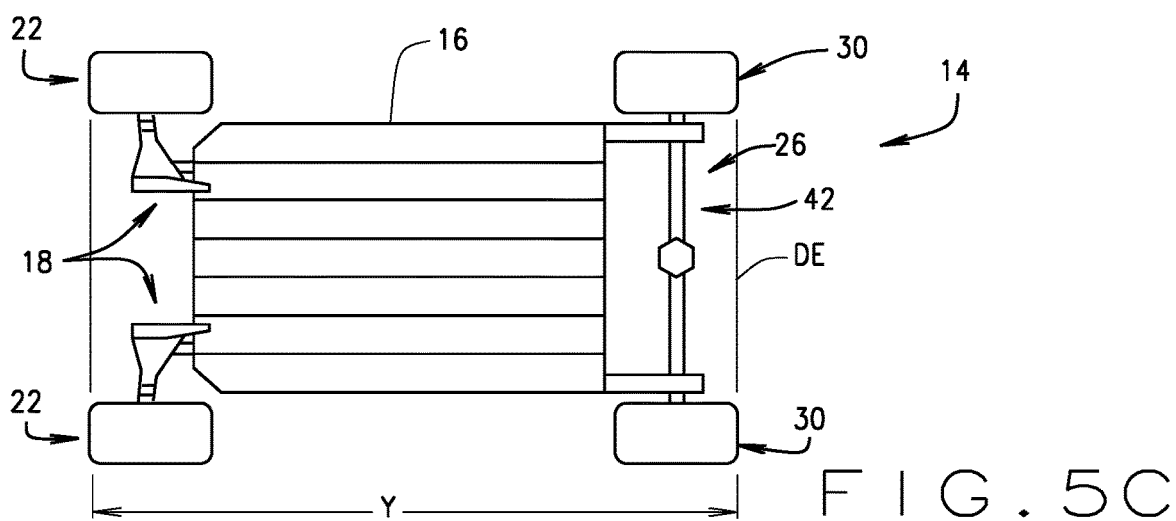

FIGS. 5A through 5C are illustrations of exemplary universal assembly platforms that comprise the exemplary chassis shown in FIGS. 3A through 3C and includes a rear suspension system comprising a solid axle rear suspension assembly having rear wheel assemblies mounted thereto, and also includes a front suspension system comprising a pair independent front suspension assemblies having front wheel assemblies mounted thereto, in accordance with various embodiments of the present disclosure.

FIGS. 6A through 6D are illustrations of various exemplary vehicles constructed using the universal assembly platforms shown in FIGS. 5A through 5C, in accordance with various embodiments of the present disclosure.

FIGS. 7A through 7E are illustrations of various exemplary vehicles constructed using the universal assembly platforms shown in FIGS. 4A through 4C, in accordance with various embodiments of the present disclosure.

FIG. 8 is an exploded view of an exemplary embodiment of the universal assembly platform shown in FIGS. 1A through 7E comprising one or more component mounting structure, in accordance with various embodiments of the present disclosure.

Figure 9:
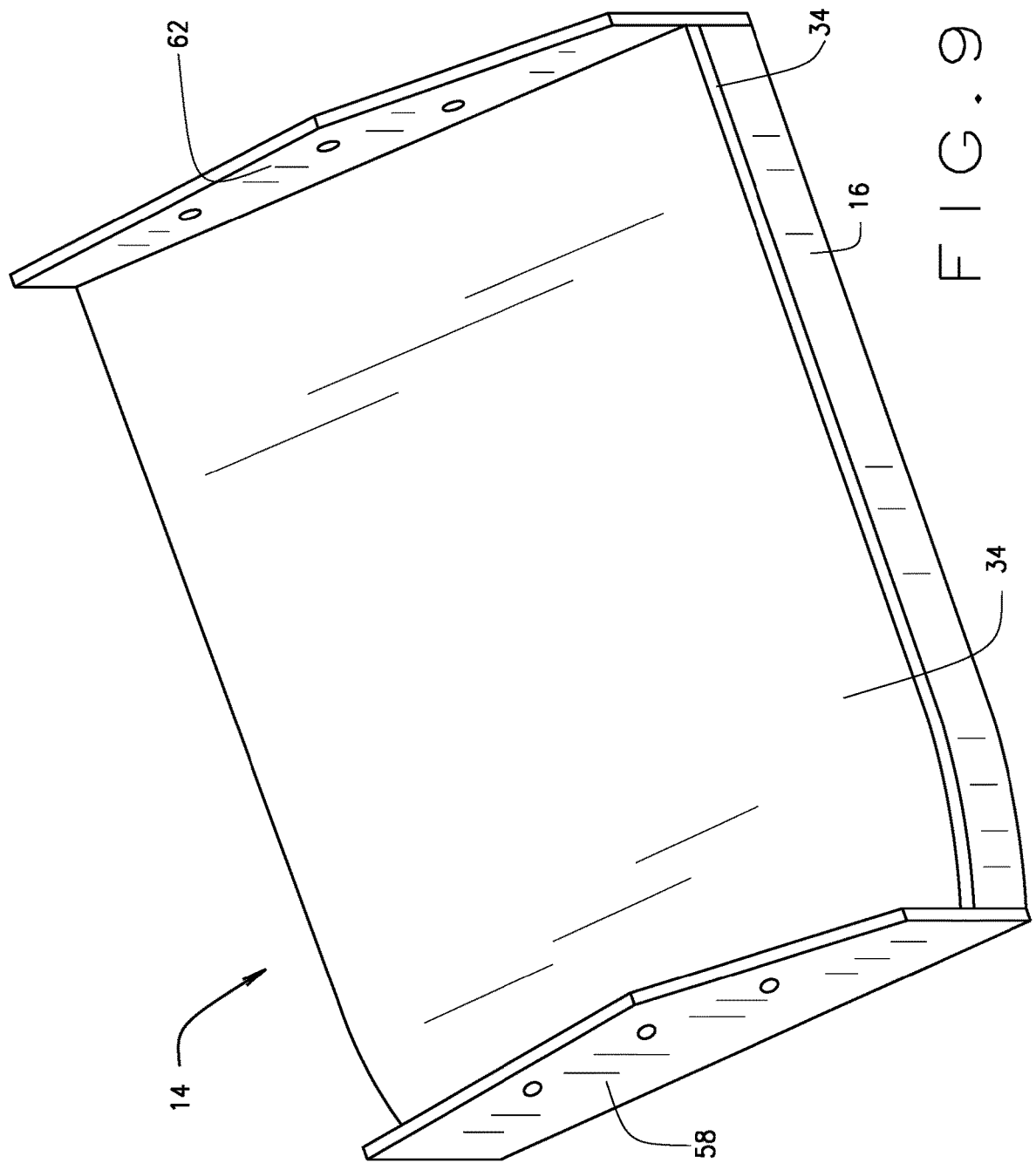

FIG. 9 is an isometric view of an exemplary embodiment universal assembly platform connected to including a front bulkhead and/or a rear bulkhead, in accordance with various embodiments of the present disclosure.

Figure 10A:
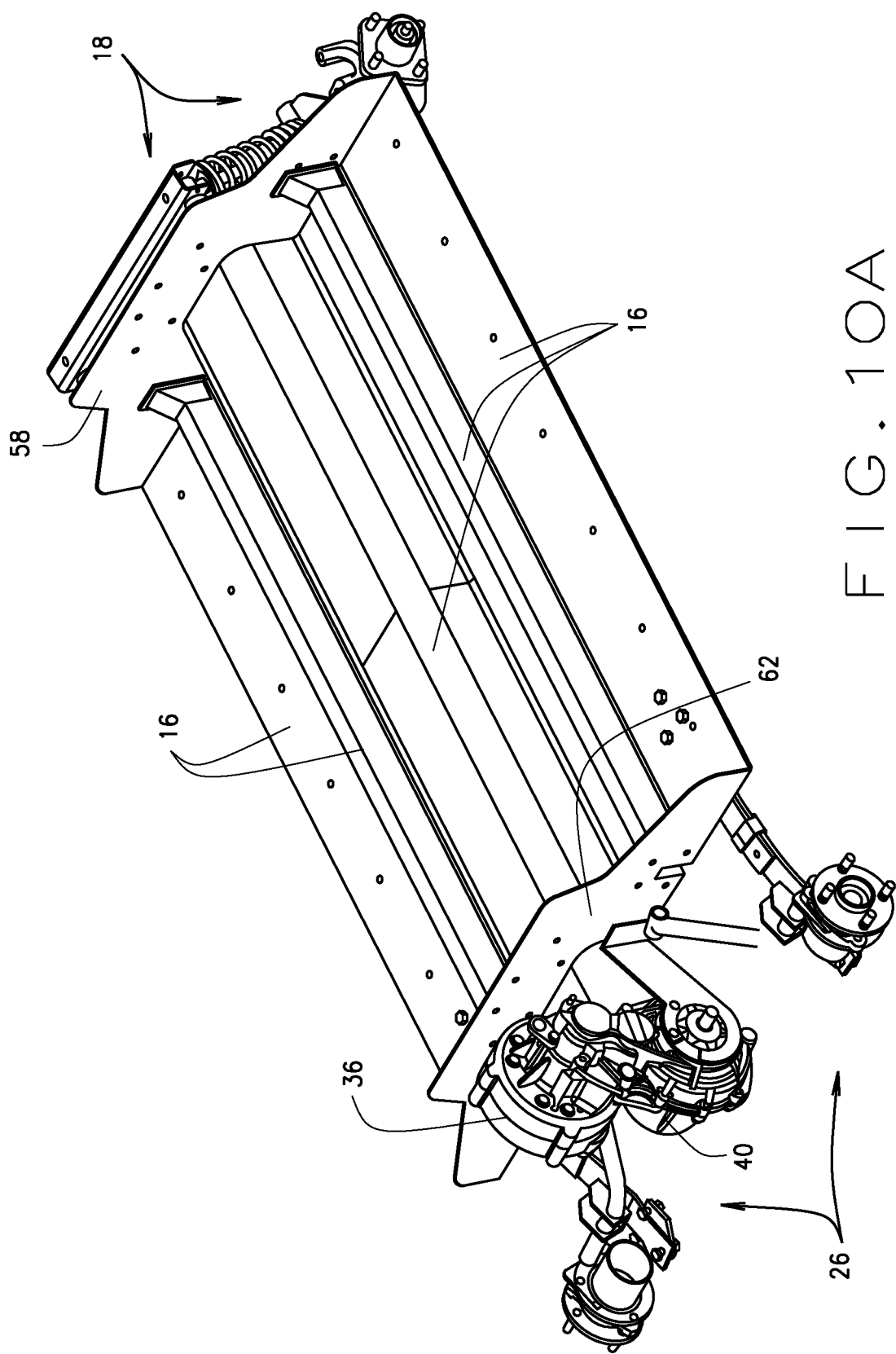

FIG. 10A is an isometric top view of another exemplary embodiment universal assembly platform connected to including the front bulkhead and/or the rear bulkhead, in accordance with various other embodiments of the present disclosure.

Figure 10B:
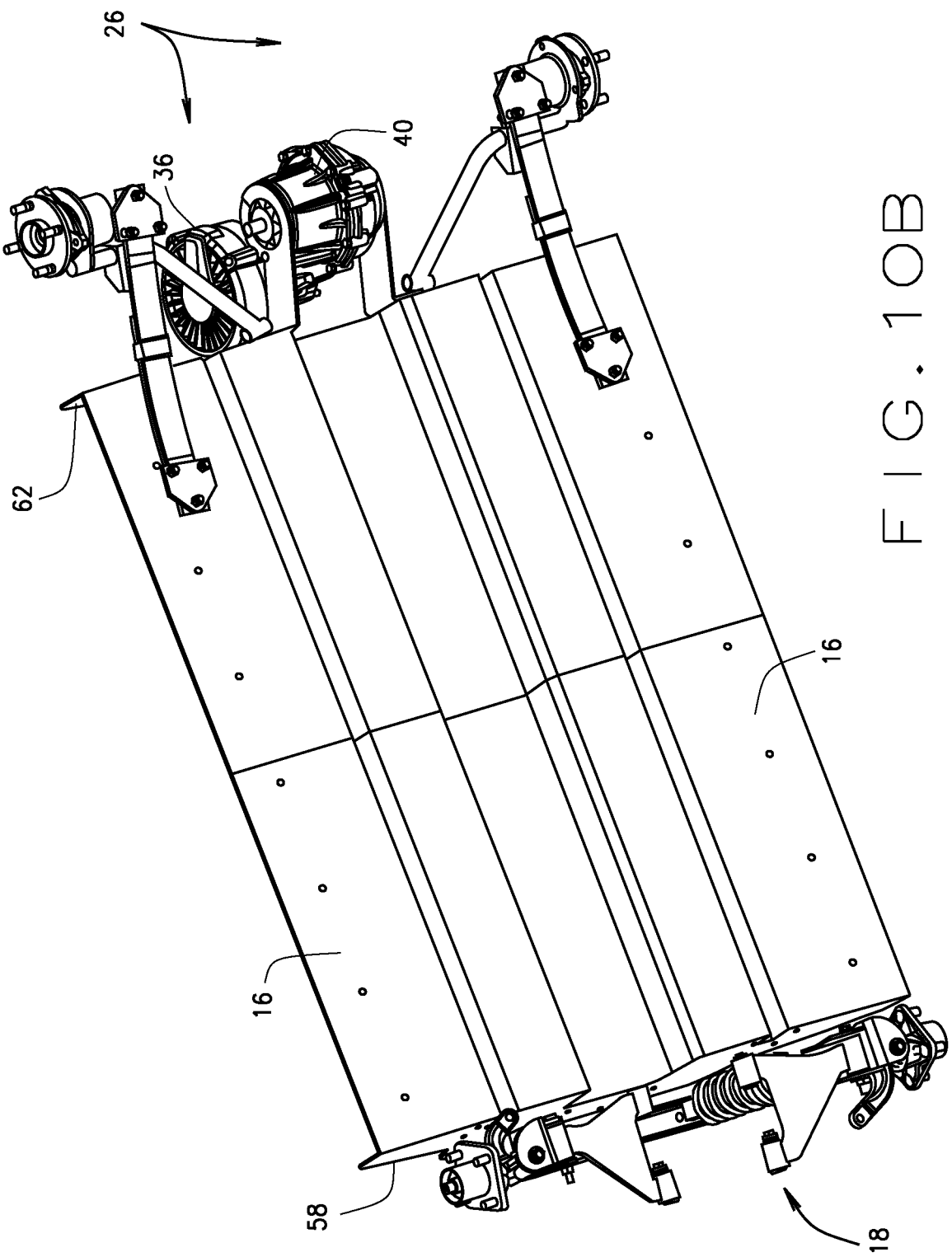

FIG. 10B is an isometric bottom view of the exemplary embodiment universal assembly platform shown in FIG. 10A including a prime mover and a transaxle, in accordance with various other embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 1A:
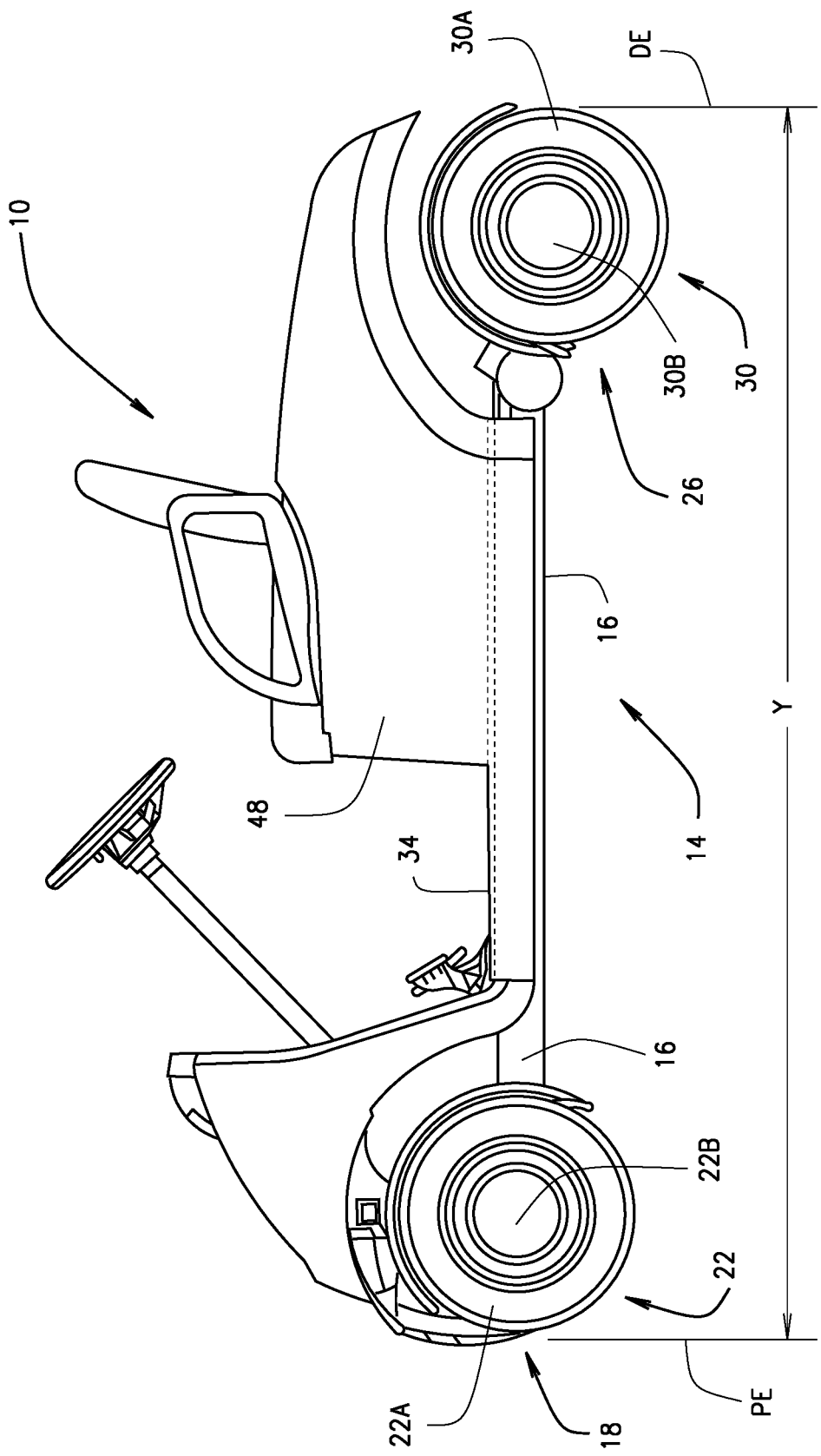
FIG. 1A is a side view of a generic lightweight vehicle constructed utilizing a universal assembly platform, in accordance with various embodiments of the present disclosure.
Figure 1B:
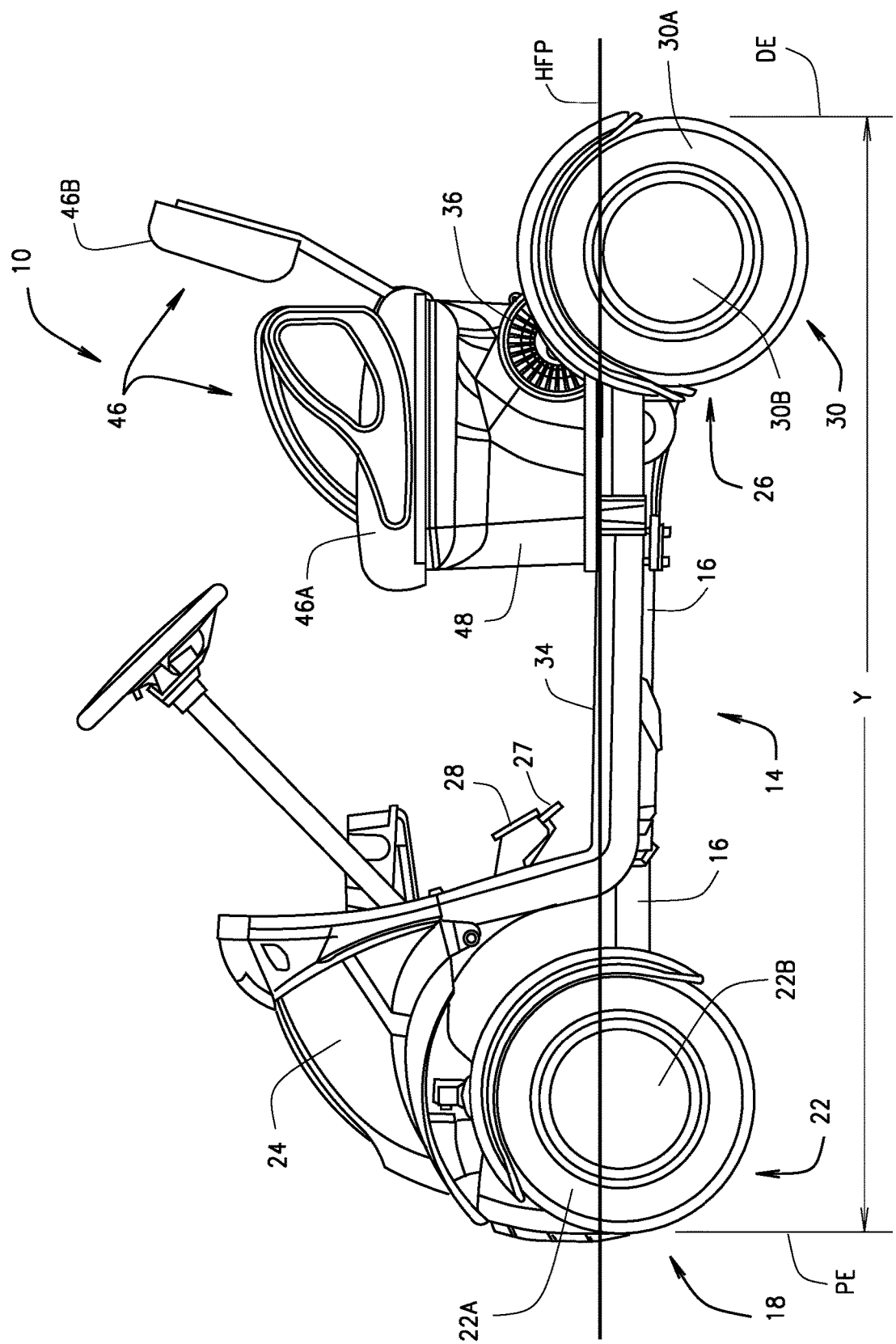
FIG. 1B is a side view of a generic lightweight vehicle constructed utilizing the universal assembly platform shown in FIG. 1A having a shorter overall length, in accordance with various embodiments of the present disclosure.
Figure 1C:
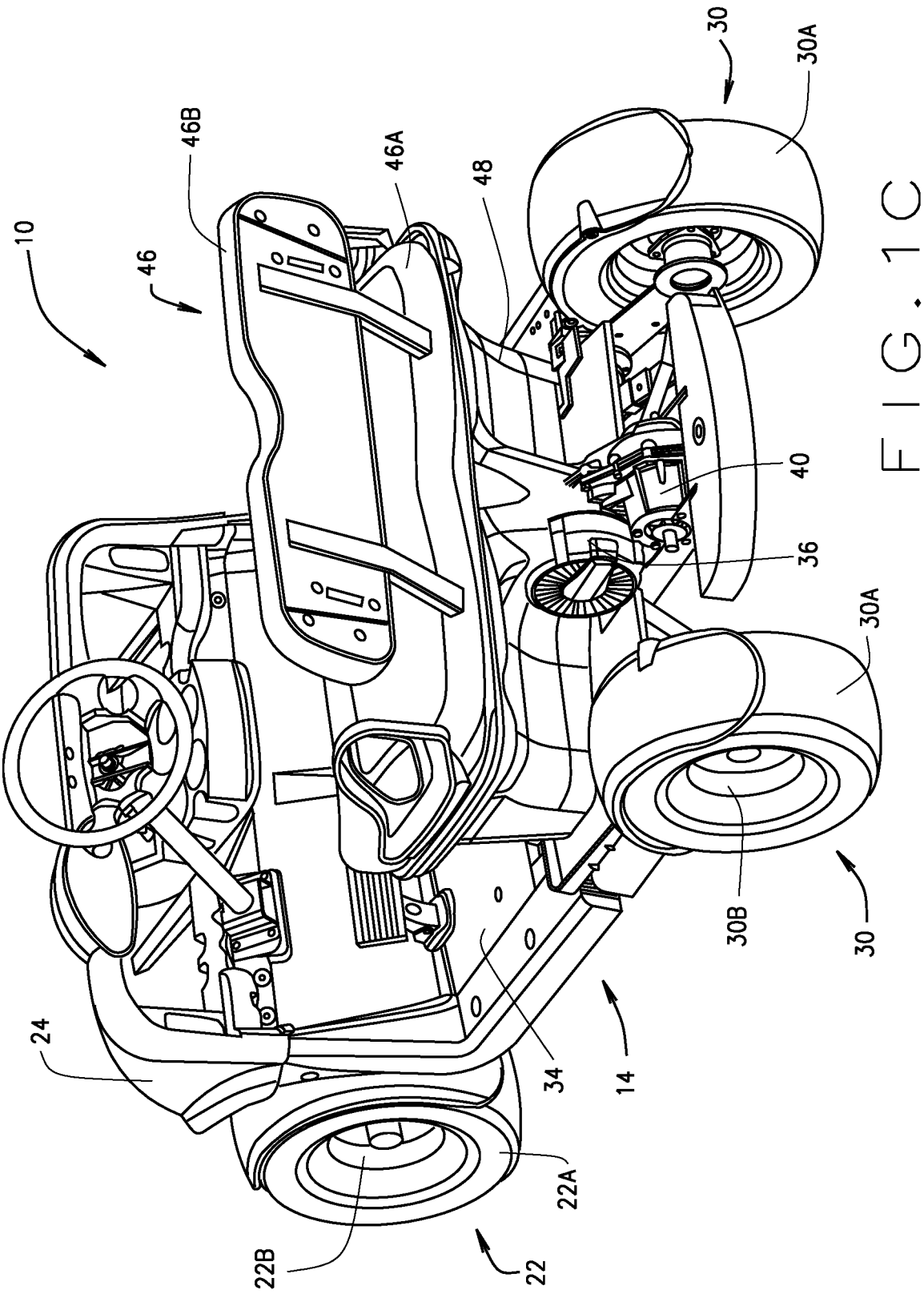
FIG. 1C is a top isometric view of the generic lightweight vehicle shown in FIG. 1B, in accordance with various embodiments of the present disclosure.
Figure 1D:
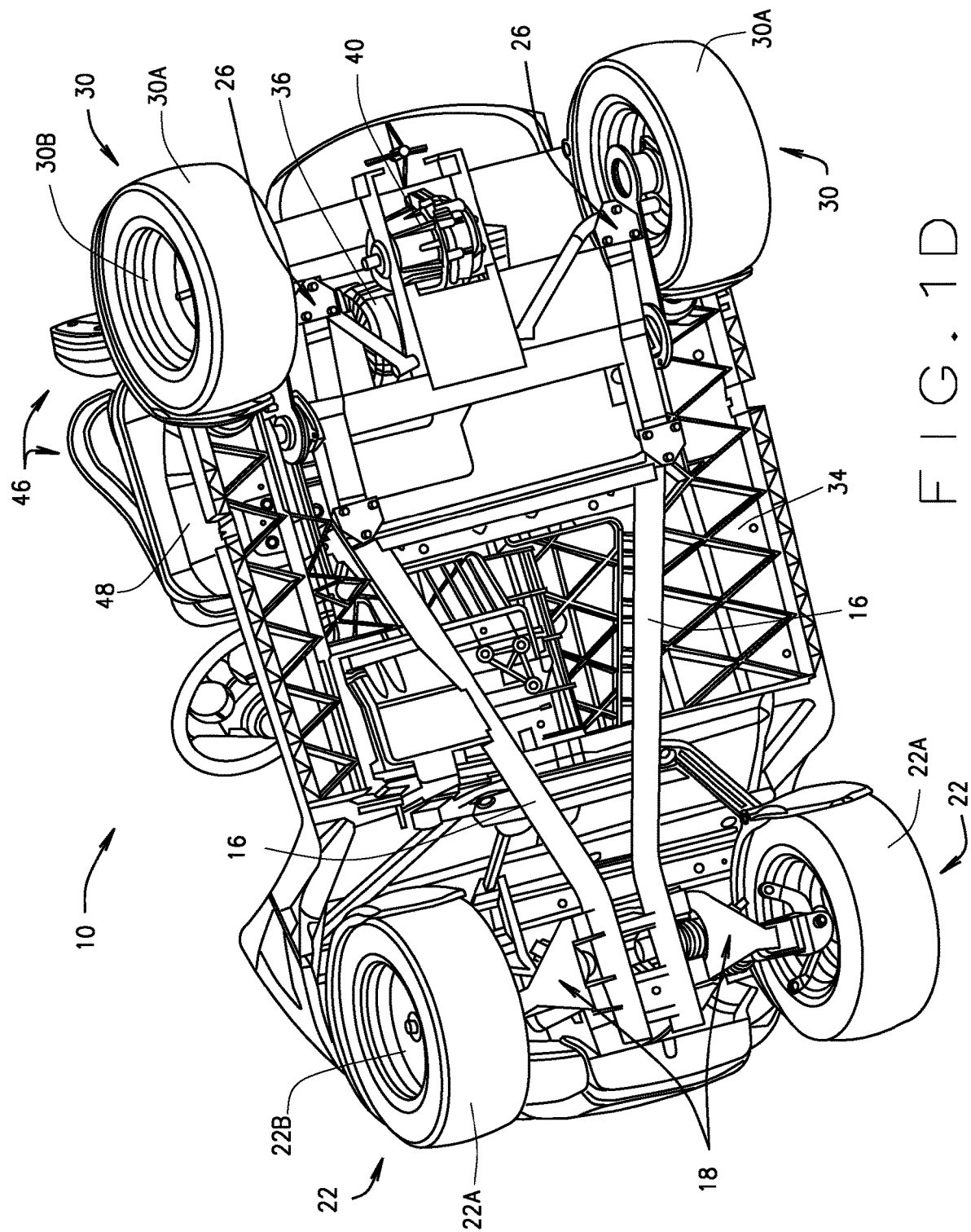
FIG. 1D is a bottom isometric view of the generic lightweight vehicle shown in FIG. 1B, in accordance with various embodiments of the present disclosure.

As illustrated in FIGS. 1A, 1B and 1C, in various embodiments, a lightweight vehicle 10 comprises a universal assembly platform 14. In some embodiments the universal assembly platform 14 comprises a main chassis structure 16, a front suspension system 18 connected to a main chassis structure 16, and a rear suspension system 26 connected to the main chassis structure 16. In various embodiments, the lightweight vehicle 10 further comprises a forward facing seating structure 46 connected to the universal assembly platform 14 and a floorboard 34 disposed on top of the main chassis structure 16. In some embodiments a front body structure 24 is mounted to the universal assembly platform 14 and in front of the forward facing seating structure 46 wherein the front body structure 24 provides one or more instrument panels and/or control elements (e.g. ignition switch, operator pedals). In various embodiments, the operator pedals (e.g. and accelerator pedal 27 and a brake pedal 28) extend from the front body structure 24 wherein they hang above the horizontal floorboard plane HFP. In various instances, the combination of the accelerator pedal 27 and brake pedal 28 are referred to as hanging pedals.

Figure 2:
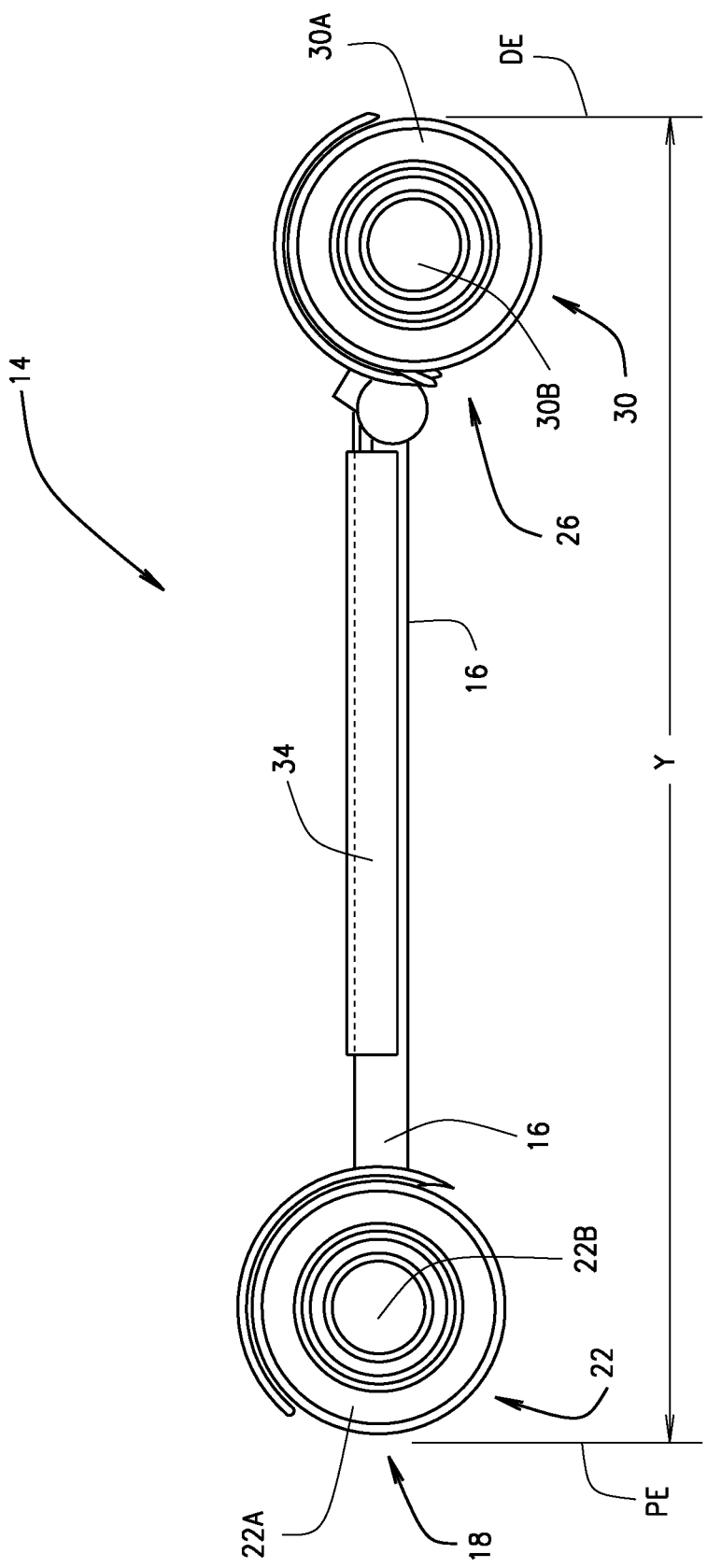
FIG. 2 is side view of a universal assembly platform that can be selectively outfitted to construct a variety of different lightweight vehicles, such as the generic vehicle shown in FIGS. 1A and 1B, in accordance with various embodiments of the present disclosure.

Referring now to FIGS. 1A, 1B 1C 1D and 2, in various embodiments, the lightweight vehicle 10 (exemplarily shown in FIGS. 1A and 1B) is assembled, built, or constructed utilizing the universal assembly platform 14 (exemplarily shown in FIG. 2). In various embodiments, the universal assembly platform 14 provides an assembly platform on which various lightweight vehicles, such as vehicle 10, can be assembled, built, or constructed such that all resulting vehicles built from the same length universal assembly platform 14 will have the same or substantially same longitudinal length Y between a forwardmost side of front tires 22A and a rearmost side of the rear tires 30A, referred to herein as the longitudinal footprint length Y of the vehicle 10. For example, a variation in tire size across lightweight vehicles built from the same length universal assembly platform 14 causes a proportional variation in longitudinal footprint length Y. It will be understood that the vehicle 10 shown in FIGS. 1A 1B 1C and 1D is only an exemplary illustration of a generic vehicle that has been assembled, built, or constructed utilizing the universal assembly platform 14. FIGS. 1A 1B 1C and 1D are only a generic example of the vehicle 10 in accordance with various embodiments. Other exemplary embodiments of vehicle 10 are illustrated and described herein with reference to the various other figures of this disclosure. Particularly, the vehicle 10 as described and illustrated herein can be any lightweight vehicle assembled, built, or constructed utilizing the universal assembly platform 14, and the scope of the present disclosure is not limited to the exemplary vehicle 10 embodiments illustrated and described herein.

The universal assembly platform 14 generally comprises a main vehicle chassis or frame structure 16, a front suspension system 18 connected to a front portion of the main vehicle chassis structure 16 and to which one or more front wheel assembly 22 can be mounted, and a rear suspension system 26 connected to a rear portion of the main vehicle chassis structure 16 and to which one or more rear wheel assembly 30 can be mounted. Particularly, the rear suspension 26 is connected to the main vehicle chassis structure 16 such that when the rear wheel assembly(ies) 30 is/are mounted to the rear suspension system 26 the rear wheel assembly(ies) 30 define(s) the rearmost limit or distal end DE of an overall longitudinal footprint length Y of the resulting vehicle. In various embodiments, the overall vehicle length can be equal to the longitudinal vehicle footprint length Y. In such instances, the distal end DE of the overall length of the resulting vehicle is also the rearmost limit or distal end of the vehicle longitudinal footprint. That is, the distance between a forwardmost side of front tires 22A and a rearmost side of the rear tires 30A is the length of the longitudinal footprint length Y, as well as the overall length of the vehicle. In various embodiments, the universal assembly platform 14 can further include a floorboard 34 disposed over a top of the main vehicle chassis structure 16. The floorboard 34 defines a floor surface of the respective lightweight vehicle constructed utilizing the universal assembly platform 14. In various embodiments the floorboard 34 is configured to fit a specific lateral width of the universal assembly platform 14 wherein the lateral width of the floorboard 34 and the lateral width of the universal assembly platform 14 are similar. For example, in various instances, the lateral width of the universal assembly platform 14 can be between 42 and 52 inches and the lateral width of the floorboard 34 can be between 42 and 52 inches. In various embodiments, the floorboard 34 lateral width defines the lateral width of the overall vehicle 10.

It will be understood that as used herein each of the front and rear wheel assemblies 22 and 30 respectively comprise a front or rear wheel/hub 22B or 30B having a front or rear tire 22A or 30A mounted thereon. It will also be understood that as used herein the rear suspension system 26 comprises the cumulative structures to which the rear wheel assembly(ies) 30 is/are connectable/mountable. For example, the rear suspension system 26 can comprise a pair of opposing independent suspension assemblies 38 mounted to the rearward end of the vehicle chassis 16, each having a respective rear wheel assembly 30 connectable/mountable thereto. Or alternatively, the rear suspension system 26 can comprise a solid axle suspension assembly having a pair of rear wheel assemblies 30 connectable/mountable to opposing ends thereof. In various embodiments, the rear solid axle suspension comprises biasing members (e.g., cantilevered leaf spring, torsion bar, transverse leaf spring, or any other device structured to keep the wheels engaged with the ground). Similarly, the front suspension system 18 can include a pair of opposing independent suspension assemblies connected to the vehicle chassis 16, each having a respective front wheel assembly 22 connectable/mountable thereto. Or alternatively, the front suspension system 18 can comprise a solid axle suspension assembly having a pair of front wheel assemblies 22 connectable/mountable to opposing ends thereof. In various embodiments, the front solid axle suspension comprises biasing members (e.g., cantilevered leaf spring, torsion bar, transverse leaf spring, or any other device structured to keep the wheels engaged with the ground).

In various embodiments the lightweight vehicle 10 further comprises a prime vehicle mover 36 (e.g., an internal combustion engine, an electric motor, or any other device structured and operable to deliver power/torque/motive force) operably connected to one or more the front and/or rear wheel assemblies 22 and/or 30 for moving the vehicle 10 over the ground. For example, in various instances the prime mover 36 can be a permanent magnet AC motor and be operably coupled to a transaxle 40 (shown in FIGS. 10A and 10B) to provide driving force to the front and/or rear wheel assemblies 22 and/or 30 of the vehicle 10. In various embodiments the prime mover 36 can be mounted to the universal assembly platform 14 wherein the entire prime mover 36 is disposed or located at a height lower than a bottom of the seat bottom 46A on the vehicle.

The universal assembly platform 14 provides vehicle manufacturers with the ability to produce/assemble a plurality of different types and/or configurations of vehicles utilizing the same universal assembly platform 14. Therefore, a manufacturer can produce universal assembly platforms 14 having a desired length, width (length and width equals the resulting vehicle's footprint), height, and structural strength and rigidity, and then utilize the universal assembly platforms 14 to assemble golf cars and/or passenger/personal transport vehicles (PTV), and/or utility vehicles, and/or various other lightweight vehicles 10. Accordingly, all vehicles 10 constructed using the universal assembly platform 14 will have the same or substantially same footprint (e.g., substantially the same length and width), and will be able to be shipped within the same or substantially same shipping envelope (e.g., within the same or substantially same space and shipping parameters). For example, a PTV and a golf car constructed utilizing the same universal assembly platform 14 will have the same or substantially same overall length Y of the longitudinal vehicle footprint, and will be able to be shipped within the same or substantially same shipping envelope.

Figure 6A:
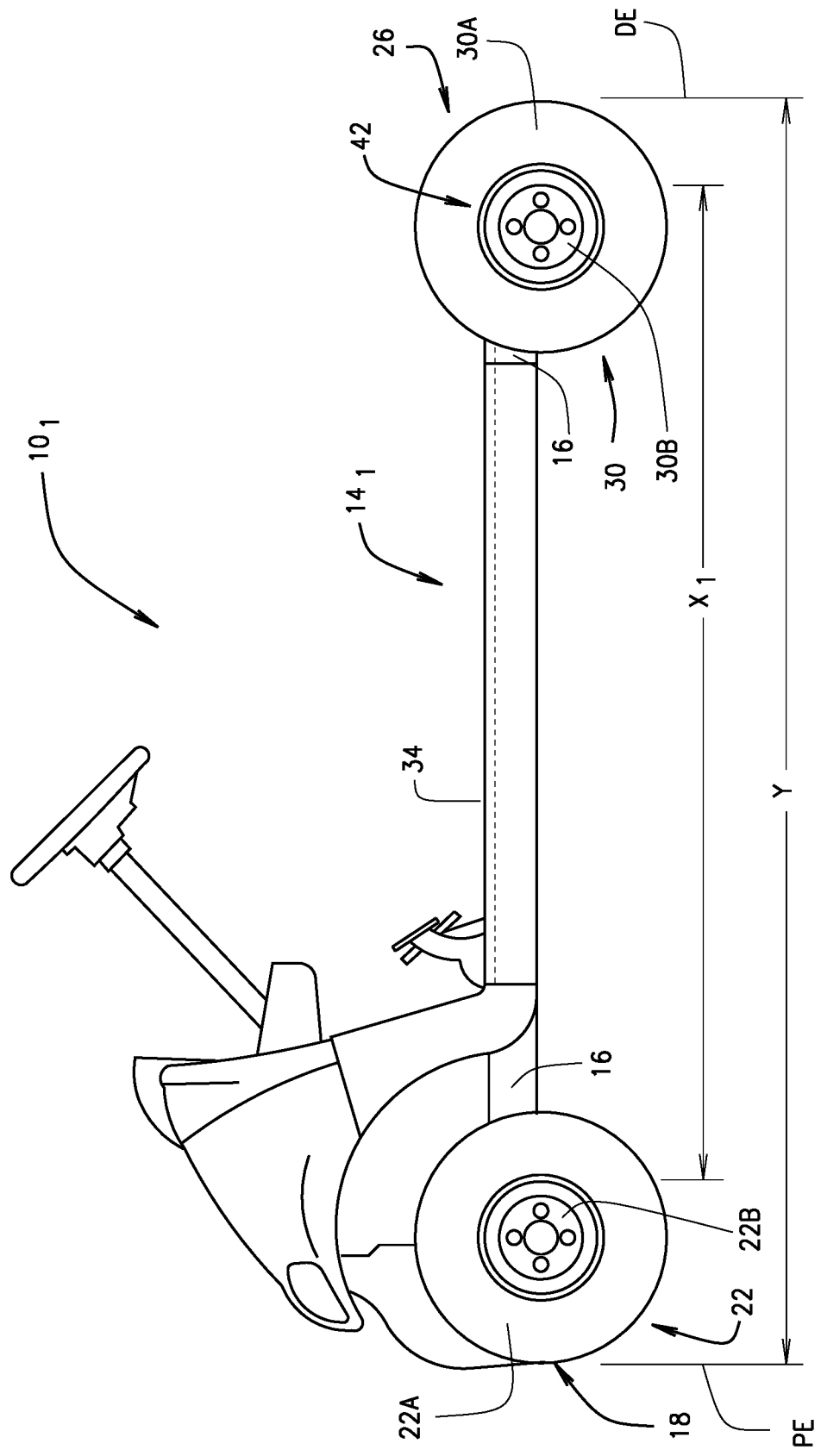
Figure 6B:
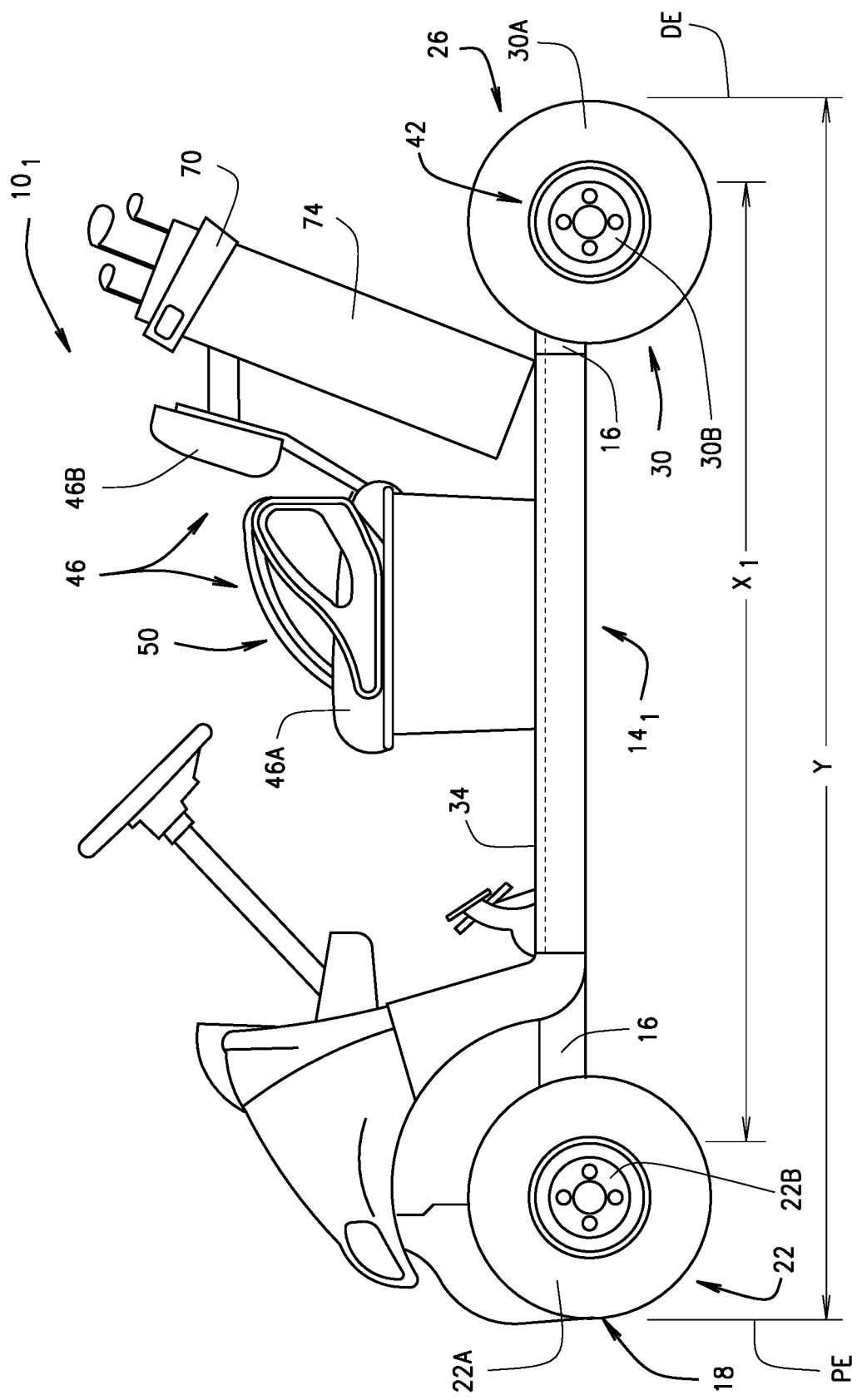
Figure 7A:
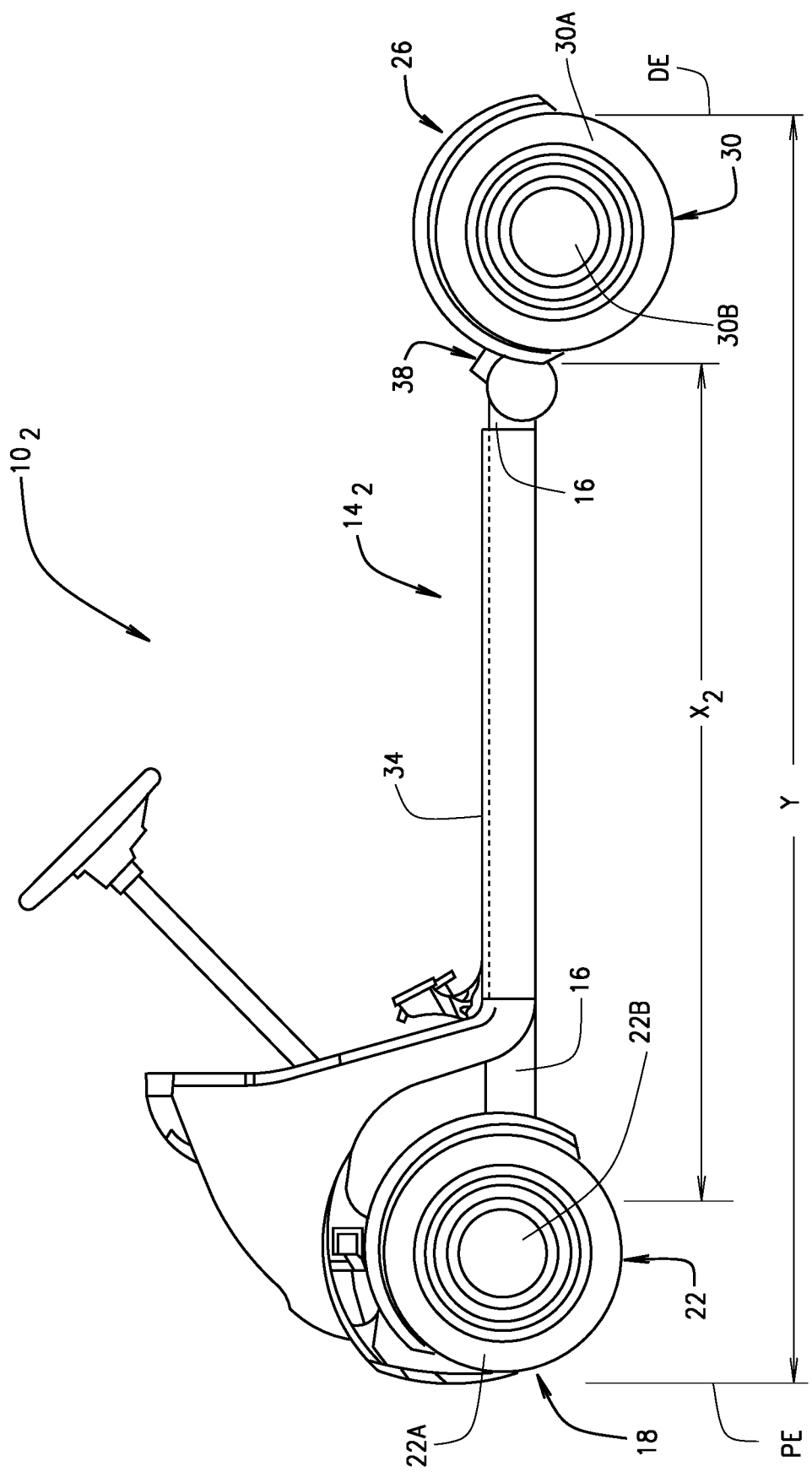
Figure 7B:
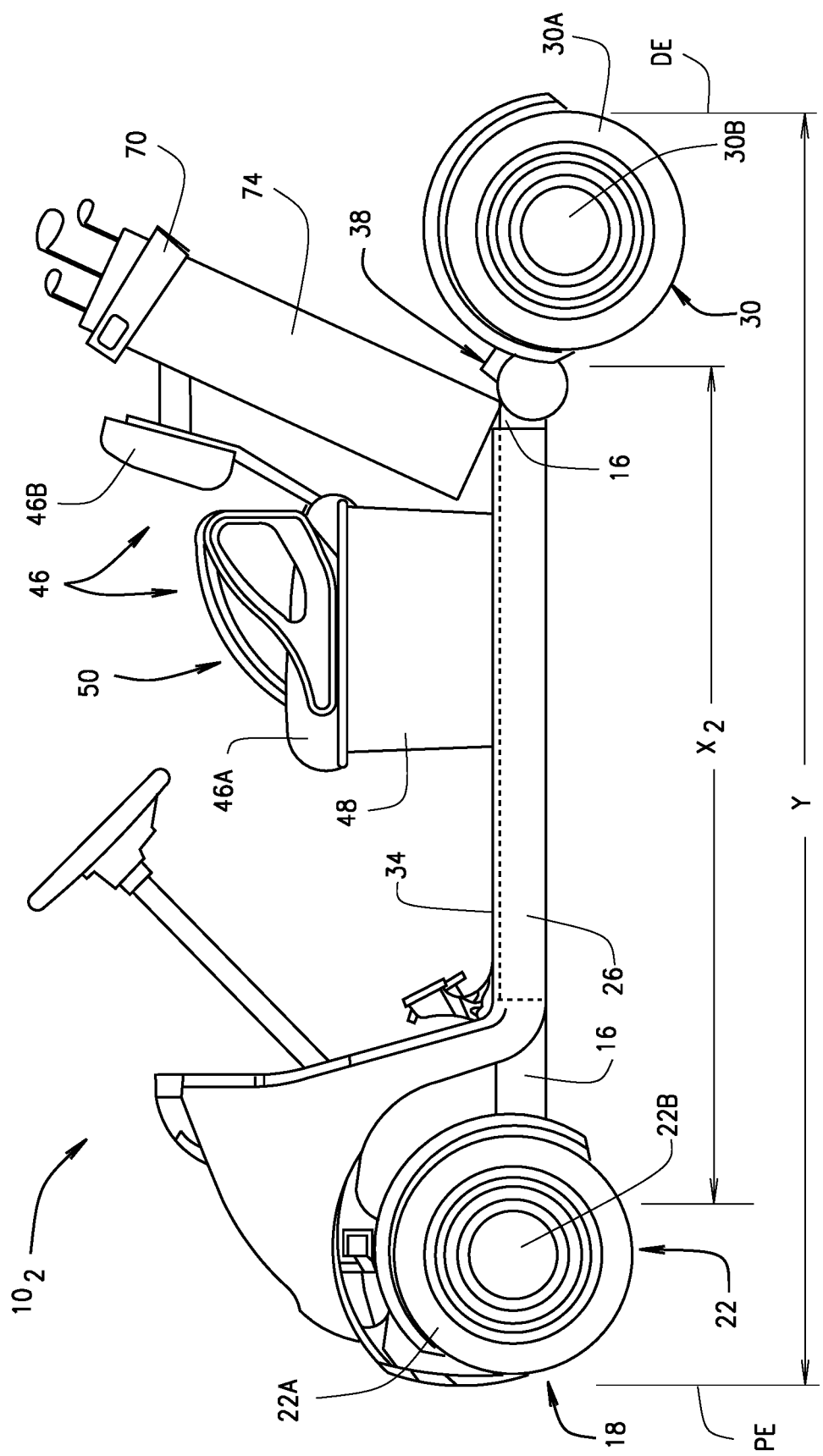

Moreover, in various embodiments, the universal assembly platform 14, having the rear suspension system 26 connected to the main vehicle chassis structure 16 such that when the rear wheel assembly(ies) 30 is/are mounted to the rear suspension system 26 the rear wheel assembly(ies) 30 define(s) the rear limit of an overall length Y of the longitudinal vehicle footprint, can be utilized to construct a golf car (e.g., the golf car exemplarily illustrated FIGS. 6B and 7B). In various embodiments the golf car comprises one or more golf bag holders 70 disposed behind the rearmost forward facing seat 46 of the vehicle 10 where the golf bag holder 70 is configured to hold at least one golf bag 74. In various embodiments the golf bag holder 70 is configured to support the golf bag 74 wherein the base of the golf bag 74 is located substantially forward of the top of the golf bag 74. In various embodiments, the universal assembly platform 14 can be utilized to construct the vehicle 10 (e.g., a golf car) having a longitudinal footprint length Y of equal to or less than 106 inches, for example, between 81 and 95 inches, e.g., in various instances equal to or less than 81 inches. In various embodiments, a golf car vehicle 10 having only a first/front row forward facing seating structure 50 can be constructed on the universal platform 14 having a shorter longitudinal footprint length Y than a vehicle having first and second row forward facing seating structures 50F and 50R (e.g. the short golf car illustrated in FIG. 1B). For example the longitudinal footprint length Y of a golf car 10 can be 81 inches or less while a personal transport vehicle (PTV) can be constructed to have a longitudinal footprint length Y of 95 inches or less.

Figure 6C:
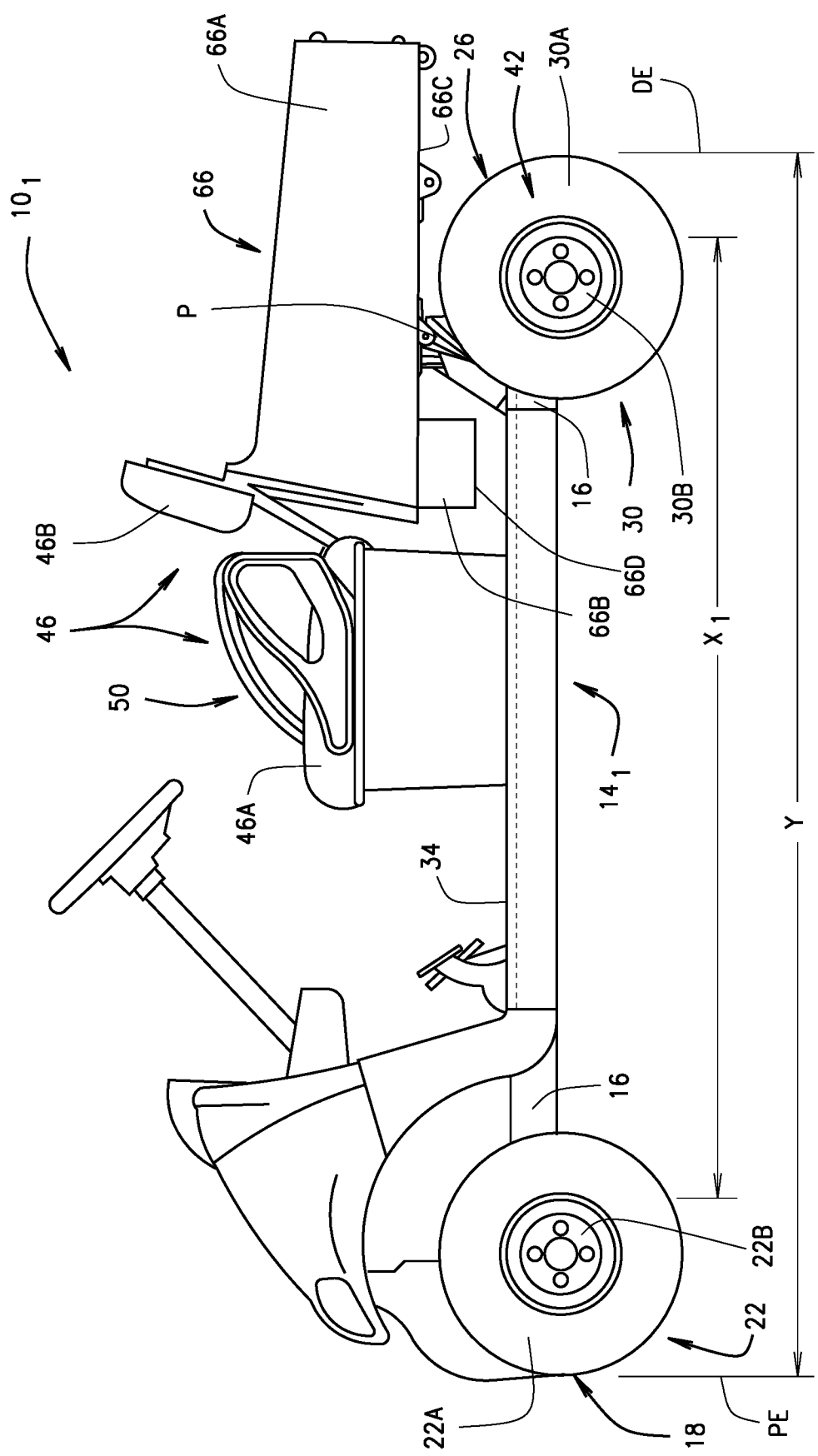
Figure 6D:
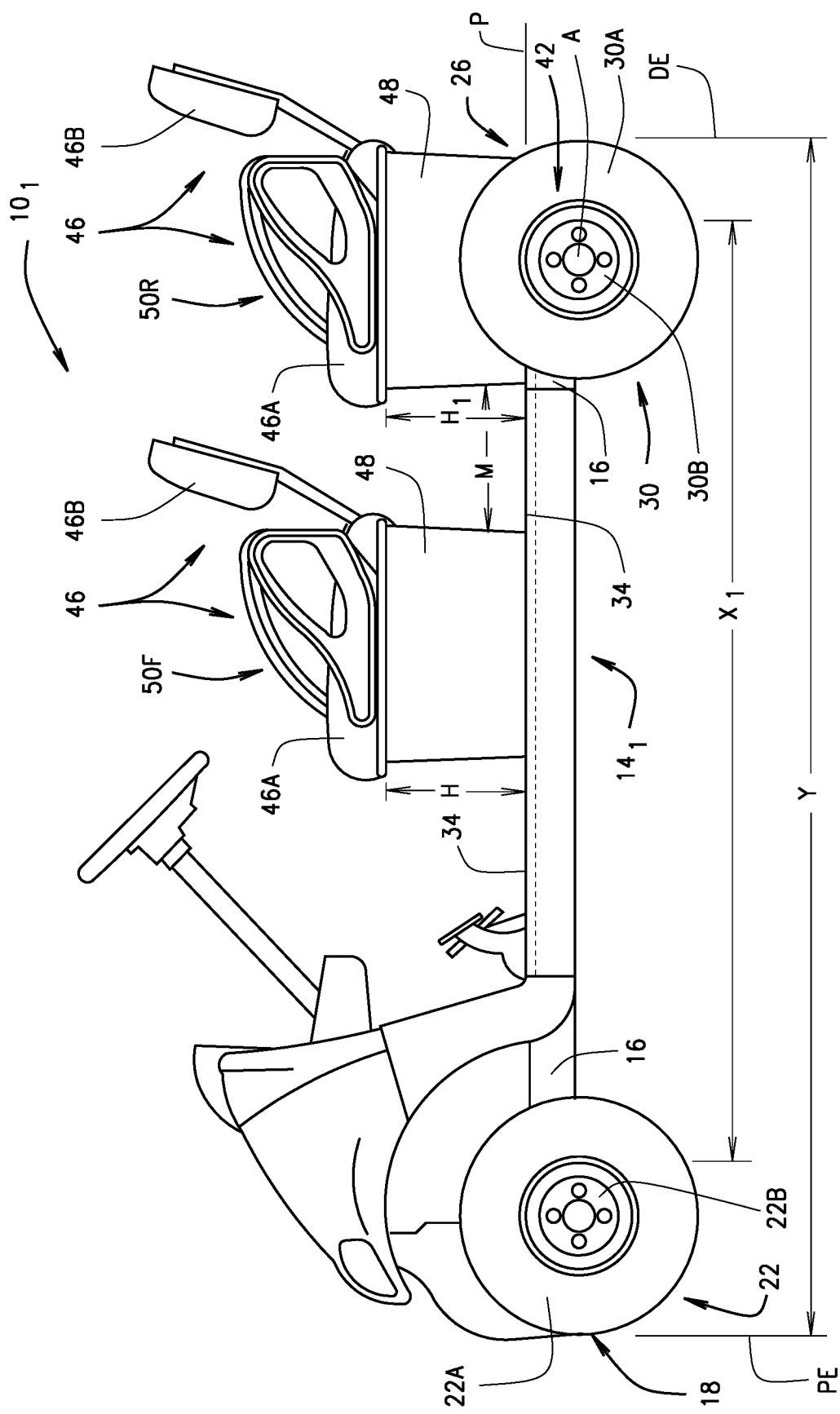
Figure 7C:
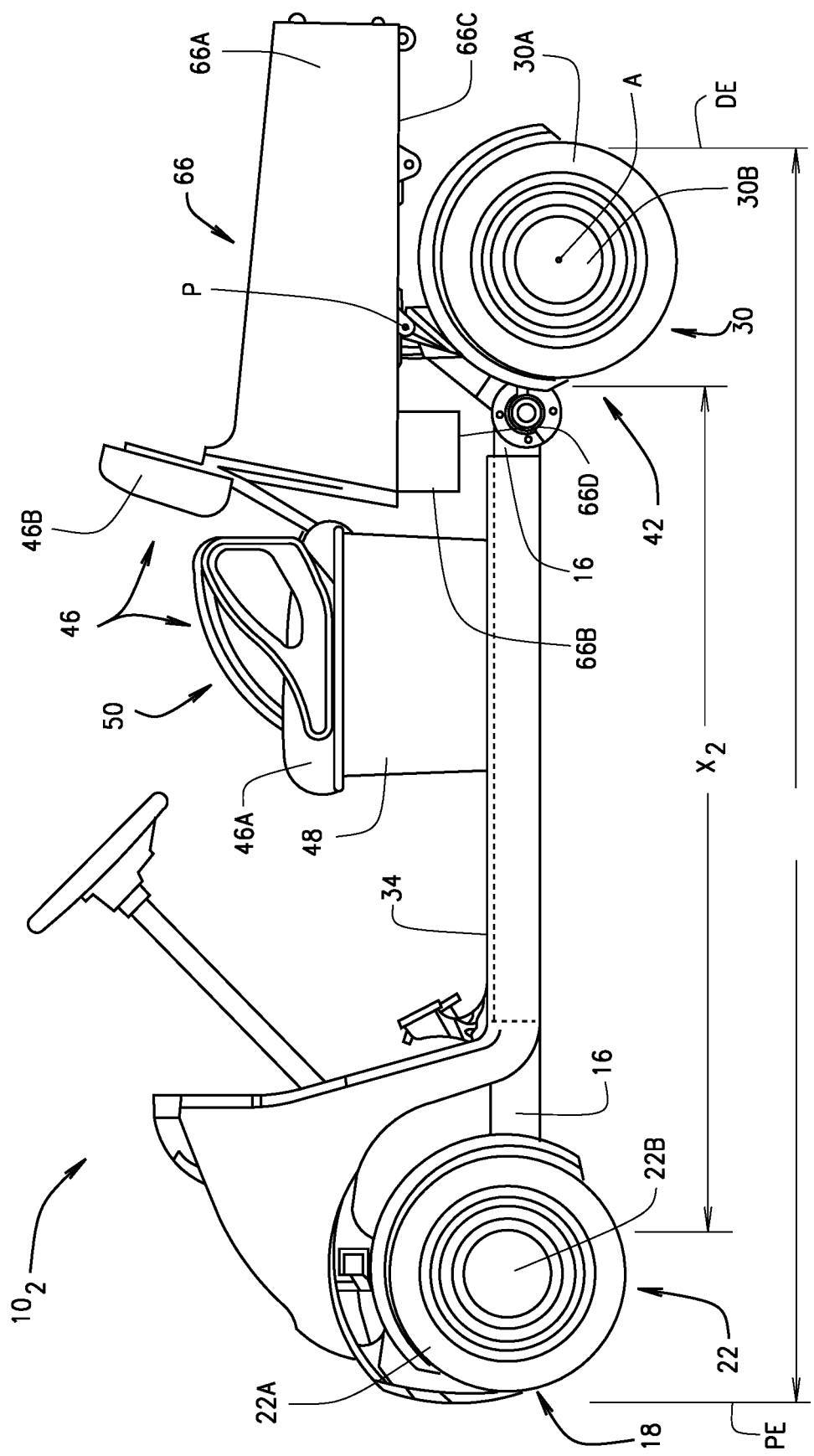
Figure 7D:
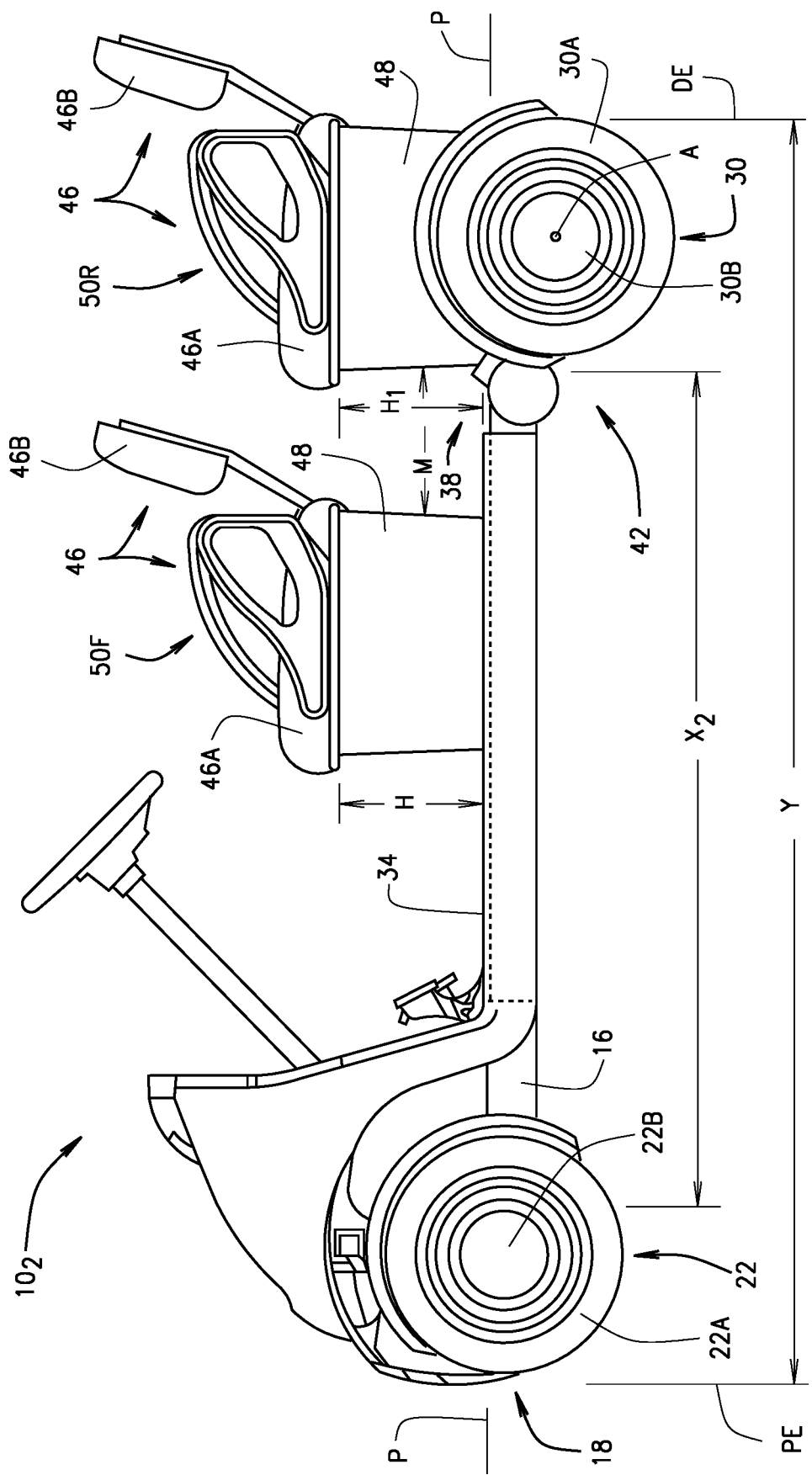

Moreover still, since, as described above, a golf car and a PTV can be constructed utilizing the universal assembly platform 14 described herein such that the resulting golf car and PTV have the same or substantially the same longitudinal footprint length Y, the universal assembly platform 14 can be utilized to construct a PTV having a forward facing rear seat (such as the PTV exemplarily illustrated in FIGS. 6D, 7D and 7E).

The vehicle chassis structure 16 can be any suitable vehicle chassis structure or vehicle frame that is structured and operable to provide the main support structure on which the vehicle 10 is assembled or built, and to which the front and rear suspension systems 18 and 26 can be connected. For example, in various embodiments, the main vehicle chassis structure 16 can comprise a frame, for example a metal (e.g., steel or aluminum) frame, that includes a plurality of interconnected or joined solid beams or hollow tubes that provide the rigidity and structural integrity of main vehicle chassis structure 16, such as exemplarily illustrated in FIGS. 3A and 3B. Or, for example, in various embodiments, the main vehicle chassis structure 16 can comprise a corrugated unibody floor pan comprising a plurality of alternating raised ridges and recessed channels that provide the rigidity and structural integrity of main vehicle chassis structure 16, such as exemplarily illustrated in FIG. 3C. In various embodiments, (as exemplarily illustrated in FIGS. 10A and 10B) the main vehicle chassis structure 16 comprises a raised tunnel structure that provides clearance for powertrain components (e.g. the vehicle prime mover, driveshaft, differential, or any other devices configured to transmit power to one or more of the front and/or wheel assemblies 22 and/or 30). For example the raised tunnel structure can span the entire longitudinal length of the main chassis structure 16 and is located laterally in the middle section of the main chassis structure 16.

In various embodiments, the rear suspension system 26 can be any rear suspension system that, when connected to the main vehicle chassis 16, is structured to dispose the rear wheel assembly(ies) 30 at the rear of the main vehicle chassis structure 16 such the rear wheel assembly(ies) 30 define(s) the rearmost limit or distal end DE of an overall length Y of the longitudinal footprint of the resulting vehicle 10, and hence the rearmost limit or distal end of the footprint of the vehicle 10. For example, as described above, in various embodiments wherein the vehicle 10 includes two rear wheel assemblies 30 (as exemplarily illustrated throughout the figures), the rear suspension system 26 can comprise a pair of independent suspension assemblies 38 as exemplarily illustrated in FIGS. 4A, 4B and 4C. Alternatively, in various other embodiments, wherein the vehicle 10 includes two rear wheel assemblies 30 (as exemplarily illustrated throughout the figures), the rear suspension system 26 can comprise beam axle, rigid axle or solid axle suspension assembly 42 as exemplarily illustrated in FIGS. 5A, 5B and 5C.

Referring now to FIGS. 6A, 6B, 6C, 6D, 7A, 7B, 7C, 7D and 7E, as described above, the universal assembly platform 14 provides vehicle manufacturers with the ability to produce/assemble a plurality of different types and/or configurations of vehicles utilizing the same universal assembly platform 14. Particularly, a manufacturer can produce universal assembly platforms 14 having a desired length, width, height, and structural strength and rigidity, and then utilize the universal assembly platforms 14 (each having same the length, width, height, and structural strength and rigidity) to assemble golf cars and/or transport vehicles, and/or utility vehicles, and/or various other lightweight vehicles. Hence, the universal assembly platform 14 can be manufactured to have various lengths, widths, heights, and structural strength and rigidity based on the desired vehicle type and vehicle configuration to be assembled.

For example, with reference to FIGS. 6A, 6B, 6C and 6D, a universal assembly platform $14_1$ having a length of $X_1$ can be fabricated for use in assembling a vehicle $10_1$ (generically illustrated in FIG. 6A) having the longitudinal footprint length of Y and configured to have a rear suspension system 26 comprising a solid beam rear suspension assembly 42 that is connected to the chassis 16 such that the universal platform length $X_1$ is located within the range defined by the longitudinal footprint Y of the vehicle 10. For example, the entire universal assembly platform 14 is forward of the distal end DE of the vehicle longitudinal footprint Y, and rearward of an opposing proximal end PE of the longitudinal vehicle footprint Y. Particularly, the solid beam rear suspension assembly 42 is connected to the chassis 16 such that the universal platform length $X_1$ is located within the range defined by the longitudinal footprint Y of the vehicle $10_1$, wherein the rearmost surface of the rear tire 30A is behind the rearmost portion of the universal platform $14_1$ and the forwardmost portion of the front tire 22A is in front of the forwardmost portion of the universal platform $14_1$. As described above in various embodiments, the overall longitudinal footprint length Y of the vehicle $10_1$ can be equal to or less than 106 inches, for example, between 81 and 95 inches, e.g., in various instances equal to or less than 81 inches.

As used herein, the word "forward" and the phrase "forward of" are used to describe the direction from a named component or structure toward the front of the vehicle (e.g., vehicle 10, $10_1$, or $10_2$). Similarly, as used herein, the word "rearward" and the phrase "rearward of" are used to describe the direction from a named component or structure toward the rear of the vehicle (e.g., vehicle 10, $10_1$, or $10_2$).

As exemplarily illustrated in FIGS. 6B, 6C and 6D, the vehicle $10_1$ can be any desired lightweight vehicle, such as a golf car, a lightweight utility/work vehicle, a passenger transport vehicle having a forward facing rear seat, etc., wherein each such vehicle $10_1$ is constructed using the same universal assembly platform $14_1$. Additionally, as further illustrated in FIGS. 6A, 6B, 6C and 6D each of the vehicles $10_1$ constructed using the universal assembly platform $14_1$ has the same longitudinal footprint length Y, and moreover, the same footprint dimensions. In various embodiments, the longitudinal footprint Y varies when different tire sizes are used across vehicles and the wheelbase $X_1$ remains the same.

As a further example, with reference to FIGS. 7A, 7B, 7C, 7D and 7E, a universal assembly platform 142 having a length of X2 can be fabricated for use in assembling a vehicle 102 (generically illustrated in FIG. 7A) having the overall longitudinal footprint length of Y and configured to have a rear suspension system 26 comprising a pair of opposing independent suspension assemblies 38 connected to the vehicle chassis 16 such that universal assembly platform length $X_2$ is located within the range defined by the longitudinal footprint Y of the vehicle 10. For example the entire universal assembly platform 14 is forward of the distal end DE, and rearward of an opposing proximal end PE of the longitudinal vehicle footprint Y. Particularly, the opposing independent suspension assemblies 38 are connected to the vehicle chassis 16 such that the universal assembly platform length $X_2$ is located within the range defined by the longitudinal footprint Y of the vehicle, e.g., rearmost surface of the rear tire 30A is behind the rearmost portion of the universal assembly platform $14_2$ and the forwardmost portion of the front tire 22A is in front of the forwardmost portion of the universal assembly platform $14_2$. As described above in various embodiments the overall longitudinal footprint length Y of the vehicle 102 can be equal to or less than 106 inches, for example, between 81 and 95 inches, e.g., in various instances equal to or less than 81 inches As exemplarily illustrated in FIGS. 7B, 7C, 7D and 7E, the vehicle $10_2$ can be any desired lightweight vehicle, such as a golf car, a lightweight utility/work vehicle, a passenger transport vehicle having a forward facing rear seat, etc., wherein each such vehicle $10_2$ is constructed using the same universal assembly platform $14_2$. Additionally, as further illustrated in FIGS. 7A, 7B, 7C, 7D and 7E each of the vehicles $10_2$ constructed using the universal assembly platform $14_2$ has the same longitudinal footprint length Y, and moreover, the same footprint dimensions. In various embodiments, the longitudinal footprint Y varies when different tire sizes are used across vehicles and the wheelbase $X_2$ remains the same.

Referring now to FIGS. 1A, 1B 1C 1D, 2 and 3A through 7E constructing a vehicle 10 utilizing the universal assembly platform 14 as described herein, provides greater flexibility in vehicle design and in placement, location, orientation, and configuration of various vehicle components such as the vehicle passenger seat(s) 46 (comprising seat bottom(s) 46A and seat back(s) 46B and associated pedestal(s) 48, cumulatively referred to herein as the seating structures 501. For example, as exemplarily shown in FIGS. 6B and 7B, the vehicle 10 configured as a golf car utilizing the universal assembly platform 14 allows for more space and flexibility for the placement, orientation, location and configuration of the golf bag retention system.

As another example, as exemplarily shown in FIGS. 6C and 7C, the vehicle 10 configured as a utility vehicle utilizing the universal assembly platform 14 allows the vehicle 10 to be configured with a cargo bed 66 (e.g, fixed or dump cargo bed) located directly above the rear suspension system 26. In various embodiments, a pivot location P of a dump cargo bed 66 can be located longitudinally forward of an axis A extending through and or between the radial center(s) of the rear wheel assembly(ies) 30. Locating the cargo bed 66 directly above the rear suspension 26 provides improved vehicle control and stability and increased cargo capacity and load limit. In various embodiments, the cargo bed 66 can comprise a main section 66A and a front section 66B wherein a bottom surface 66C of the main section 66A is located at a height above a bottom surface 66D of the front section 66B. In various instances, the bottom surfaces 66C and 66D of the main front sections 66A and 66B of the cargo bed 66 is located at a height below the seat bottom 46A.

As yet another example, as exemplarily shown in FIGS. 6D, 7D and 7E, the vehicle 10 configured as a passenger transport vehicle utilizing the universal assembly platform 14 allows the vehicle 10 to be configured with a second/rear row of forward facing seats 46, i.e., a second/rear row forward facing rear seating structure 50R located behind a first/front row forward facing front seating structure 50F. In such configurations, the universal assembly platform 14 allows the second/rear row seating structure 50R to be located directly above the rear suspension system 26, in various instances directly above a axis A extending through and or between the radial center(s) of the rear wheel assembly(ies) 30, such that the second/rear row seating structure 50R is sufficiently spaced apart from the first/front row seating structure 50 to provide ample and comfortable foot room, or footwell, distance M therebetween. In various embodiments, the second/rear row seating structure 50R can be mounted to the universal assembly platform 14 such that a portion of the second/rear row seating structure 50R is not directly above the main chassis structure 16. For example, in various instances the second/rear row seating structure 50R is cantilevered past the universal assembly platform length $X_1$ or $X_2$. In various embodiments, the second/rear row seating structure 50R can be located directly above the axis A such that at least a portion of the seat back 46B of the rear row seating structure 50R is located rearward beyond or behind the axis A. For example, in various instances the entire seat back 46B can be located rearward beyond or behind the axis A. In some embodiments the seat back 46B extends past the distal end DE of the longitudinal footprint Y and/or the rearmost portion of the rear tire 30A. In various instances, the second/rear row seating pedestal 48 has a height H1 that can be equal to the first/front row seating pedestal height H. In various embodiments, the second/rear row seating pedestal height H1 can be greater than the first/front row seating pedestal height H.

In various embodiments, the front row seat 46 and seating structure 50F is the forward most seat 46 and seating structure 50 of the personal transport vehicle 10, i.e., the seat 46 and seating structure 50F that is located nearest the front of the respective personal transport vehicle 10, in which the driver of the respective vehicle 10 will be seated to operate the respective personal transport vehicle 10. Furthermore, the rear row seat 46 and seating structure 50R of the personal transport vehicle 10 is the one or more rows of seats 46 and seating structures 50R located behind or rearward (i.e., toward the rear of the vehicle 10) of the front row seat 46 and seating structure 50F.

Referring now to FIGS. 6D, 7D and 7E, as described above, in various embodiments the universal assembly platform 14 (e.g., 14₁ in FIG. 6D and 14₂ in FIGS. 7D and 7E) can be utilized to construct a passenger transport vehicle 10 (e.g., 10₁ in FIG. 6D and 10₂ in FIGS. 7D and 7E) having a rear row seat 46 and seating structure 50R that is forward facing (i.e., passengers utilizing the rear row seat 46 and seating structure 50R will be seated facing forward toward the front of the vehicle 10) with a foot room or footwell, distance M between the front row seat 46 and seating structure 50. In various embodiments, the foot room/footwell distance M can be between 18 and 36 inches, e.g., 18 to 24 inches. And moreover, such passenger transport vehicles 10 having the forward facing rear seating structure 50R can be constructed utilizing the universal assembly platform 14, wherein the resulting vehicle 10 can have the same overall longitudinal footprint length Y as other vehicles constructed utilizing the universal platform 14 (e.g., golf cars constructed utilizing the universal platform 14). And still further, as exemplarily shown in FIG. 1B, golf cars constructed utilizing the universal platform 14 can have a shorter longitudinal footprint length Y than passenger transport vehicles 10 having the forward facing rear seating structure 50R. For example, the golf car shown in FIG. 1B can be constructed utilizing a shorter universal assembly platform 14.

As shown in FIGS. 6D, 7D and 7E, when the personal transport vehicle 10 (e.g., 10₁ in FIG. 6D and 10₂ in FIG. 7D) is constructed utilizing the universal assembly platform 14 (e.g., 14₁ in FIG. 6D and 14₂ in FIG. 7D) the forward facing rear seating structure 50R is disposed on (e.g., mounted on or connected to) the chassis 16 and/or the floorboard 34 and/or other support structure such that the forward facing rear seating structure 50R is disposed directly above, and in various instances, substantially centered above, the axis A of the rear wheel assemblies 30. As used herein, describing that in various instances the forward facing rear seating structure 50R is disposed directly above and substantially centered above the axis A of the rear wheel assemblies 30 means that the forward facing rear seating structure 50R is disposed directly above the axis A such that approximately half of the rear row seat pedestal 48 is oriented, disposed, positioned or aligned forward of the axis A, and approximately half of the rear row seat pedestal 48 is oriented, disposed, positioned or aligned rearward of the axis A.

Moreover, chassis structure 16 is structured to have a substantially flat, planar profile such that a bottom of the seat pedestal 48 of the forward facing rear seating structure 50R is disposed on same plane P as a bottom of the seat pedestal 48 of the forward facing front seating structure 50. For example, in various embodiments, due to the substantially flat, planar profile of the chassis structure 16, the forward facing rear seating structure 50R is disposed on (e.g., mounted on or connected to) the chassis 16 and/or the floorboard 34 and/or other support structure such that the junction where the rear row seat pedestal 48 contacts the chassis 16 and/or the floorboard 34 and/or other support structure to which it is mounted is substantially in the same plane P as the junction where the front row seat pedestal 48 contacts the chassis 16 and/or the floorboard 34 and/or other support structure to which it is mounted. Furthermore, the floor surface, e.g., the floorboard 34, on which a passenger sitting the rear row seat 46 will rest his/her feet is in substantially the same plane P as the floor surface, e.g., the floorboard 34, on which a passenger sitting the front row seat 46 will rest his/her feet. Still further in various embodiments, the height H of front pedestal 48 is substantially the same as the height H1 of the rear row seat pedestal 48 H such that the front and rear row seat bottoms 46A are disposed, located or oriented at the same height above the floorboard 34 and/or the chassis 16. In various embodiments, the height H1 is greater than the height H. Still yet further, the chassis 16 of the universal assembly platform is constructed such that a top surface or side of the entire chassis 16 lays within the same plane P such that the front and rear row seat pedestals 48 are mounted on or connected to the chassis 16 and/or the floorboard 34 and/or other support structure in substantially the same plane P.

Referring now to FIG. 8, in various embodiments, the universal assembly platform 14 can further comprise at least one vehicle component mounting structure 54 that is/are integrally formed with and/or mounted to the main vehicle chassis structure 16. The vehicle component mounting structure(s) 54 is/are structured and operable to enable at least one vehicle component to be mounted to the universal assembly platform 14 during assembly/construction of the vehicle 10. The vehicle component mounting structure(s) 54 can be any structure suitable for connecting or mounting vehicle components such as the seat pedestals 48, a front cowl of the vehicle, side panels of the vehicle, rollover protection systems (ROPS), canopy systems, the floorboard 34, etc. For example, in various instances the vehicle component mounting structure(s) 54 can be track(s) or channel(s) integrally formed with or connected to (e.g., welded to) the main vehicle chassis structure 16 for adjustably/movably mounting the seat pedestals 48 (or other vehicle components) to the main vehicle chassis structure 16. Or, the vehicle component mounting structure(s) can be hooks, or loops, or flanges, or tabs, or threaded bolts, or threaded holes, etc., that can be utilized to connect or mount various other vehicle components (e.g., front cowl, side panels, ROPS, canopy systems, the floorboard 34, etc.) to the main vehicle chassis structure 16. Although FIG. 8 exemplarily illustrates the vehicle component mounting structure(s) 54 integrally formed with or connected to the chassis 16 illustrated in FIG. 3A, it should be understood that the vehicle component mounting structure(s) 54 can be integrally formed with or connected to any suitable chassis 16 such as those exemplarily illustrated in FIGS. 3B and 3C, or any other suitable chassis utilized to provide the chassis 16 for the universal assembly platform 14 as described herein.

Referring now to FIGS. 9, 10A and 10B, in various embodiments, the universal assembly platform 14, as exemplarily illustrated in FIGS. 1A through 8, can be connected to or include a front bulkhead 58 and/or a rear bulkhead 62 that are structured and operable to provide a connection means, or connecting structure for mounting various components of the vehicle 10 to the universal assembly platform 14. For example, in various instances, the front bulkhead 58 can be utilized to mount or connect the front suspension system 18 to the universal assembly platform 14, and/or the rear bulkhead 62 can be utilized to mount or connect the rear suspension system 26 to the universal assembly platform 14. Alternatively, the front and/or rear bulkhead(s) 58 and/or 62 can be utilized to mount a vehicle prime mover (e.g., an internal combustion engine and/or an electric motor) to the universal assembly platform 14, or to mount all or a portion of the vehicle powertrain and/or driveline to the universal assembly platform 14, or to mount any other vehicle component to the universal assembly platform 14.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A lightweight vehicle, said lightweight vehicle comprising:
    a pair of rear wheel assemblies;
    one or more front wheel assembly;
    a universal assembly platform, said platform comprising:
        a planar main vehicle chassis structure;
        a front suspension system connected directly to the planar main vehicle chassis structure and to which the one or more front wheel assembly is mounted;
        a rear suspension system connected directly to the planar main vehicle chassis structure and to which the pair of rear wheel assemblies are mounted, wherein a front distal end of the at least one front wheel assembly is longitudinally forward of a front end of the planar main vehicle chassis and a rear distal end of the rear wheel assemblies are longitudinally rearward of a rear end of the planar main vehicle chassis; and
    a forward facing seating structure mounted to the planar main vehicle chassis such that a portion of a seat bottom of the seating structure is located longitudinally rearward of an axis extending through a center of the rear wheel assemblies.

2. The vehicle of claim 1, wherein the rear suspension system comprises at least one independent suspension assembly.

3. The vehicle of claim 1, wherein the rear suspension system comprises a solid axle suspension assembly.

4. The vehicle of claim 1, wherein the universal assembly platform further comprises at least one of a front bulkhead and a rear bulkhead.

5. The vehicle of claim 1, further comprising one or more golf bag holders.

6. The vehicle of claim 1, wherein the longitudinal footprint length is equal to or less than 81 inches.

7. The vehicle of claim 1, further comprising a prime vehicle mover operably connected to one or more wheel assemblies, wherein the prime mover is a permanent magnet AC motor.

8. The vehicle of claim 7, wherein the prime vehicle mover is operably connected to drive two rear wheels.

9. A lightweight vehicle, said lightweight vehicle comprising:
    a pair of rear wheel assemblies;
    one or more front wheel assembly;
    a universal assembly platform for lightweight vehicles, said platform comprising:
        a planar main vehicle chassis structure;
        a floorboard disposed on a top of the planar main vehicle chassis structure;
        a front suspension system connected to the main vehicle chassis structure and to which the one or more front wheel assembly is mounted; and
        a rear suspension system connected to the main vehicle chassis structure and to which the pair of rear wheel assemblies are mounted such that the pair of rear wheel assemblies define the rearmost limit of an overall length of the vehicle; and
    a front row forward facing seating structure connected to the universal assembly platform, the front row forward facing seat structure comprising:
        a front row seat pedestal mounted to the universal assembly platform; and
        a front row seat mounted to the front row seat pedestal, the front row seat comprising a seat bottom and a seat back; and
    a rear row forward facing seating structure connected to the universal assembly platform, the rear row forward facing seat structure comprising:
        a rear row seat pedestal mounted to the universal assembly platform such that a bottom of the rear row seat pedestal is disposed on same plane as a bottom of the front row seat pedestal; and
        a rear row seat mounted to the seat pedestal, the seat comprising a seat bottom and a seat back,
    wherein the seat pedestal of the rear row forward facing seating structure is mounted to the universal assembly platform such that the seat pedestal of the rear row forward facing seating structure is disposed between the pair of rear wheel assemblies, and a portion of the seat back extends behind the rear distal end of rear wheel assemblies.

10. The vehicle of claim 9 where the longitudinal footprint length of the vehicle is equal to or less than 95 inches.

11. The vehicle of claim 9, wherein the main chassis structure is structured to have a substantially flat profile such that a bottom of a seat pedestal of the rear row forward facing seating structure is disposed on same plane as a bottom of a seat pedestal of the front row forward facing seating structure.

12. The vehicle of claim 9, further comprising an accelerator and brake pedal wherein the pedals are configured as hanging pedals.

13. The vehicle of claim 9, wherein the main chassis structure is structured to have a substantially flat profile such that a bottom of a seat pedestal of the rear row forward facing seating structure is disposed on same plane as a bottom of a seat pedestal of the front row forward facing seating structure.

14. The vehicle of claim 9, wherein the universal assembly platform comprises at least one of a front bulkhead and a rear bulkhead.

15. A lightweight vehicle, said lightweight vehicle comprising:
   a pair of rear wheel assemblies;
   one or more front wheel assembly;
   a universal assembly platform for lightweight vehicles, said platform comprising:
      a planar main vehicle chassis structure;
      a floorboard disposed on a top of the planar main vehicle chassis structure;
      a front suspension system connected directly to the planar main vehicle chassis structure and to which the one or more front wheel assembly is mounted; and
      a rear suspension system connected directly to the planar main vehicle chassis structure and to which the pair of rear wheel assemblies are mounted, wherein a front distal end of the at least one front wheel assembly is longitudinally forward of a front end of the planar main vehicle chassis and a rear distal end of the rear wheel assemblies are longitudinally rearward of a rear end of the planar main vehicle chassis; and
   a front row forward facing seating structure connected to the universal assembly platform, the front row forward facing seat structure comprising:
      a front row seat pedestal mounted to the universal assembly platform; and
      a front row seat mounted to the front row seat pedestal, the front row seat comprising a seat bottom and a seat back; and
   a rear row forward facing seating structure connected to the universal assembly platform, the rear row forward facing seat structure comprising:
      a rear row seat pedestal mounted to the universal assembly platform such that a bottom of the rear row seat pedestal is disposed on same plane as a bottom of the front row seat pedestal; and
      a rear row seat mounted to the seat pedestal, the seat comprising a seat bottom and a seat back,
   wherein the seat pedestal of the rear row forward facing seating structure is mounted to the universal assembly platform such that the seat pedestal of the rear row forward facing seating structure is disposed between the pair of rear wheel assemblies, and a portion the rear row seat pedestal and the rear row seat bottom are located longitudinally rearward of an axis extending through a center of the rear wheel assemblies.

16. The vehicle of Claim 15, wherein the planar main chassis structure is structured to have a substantially flat profile such that a bottom of a seat pedestal of the rear row forward facing seating structure is disposed on same plane as a bottom of a seat pedestal of the front row forward facing seating structure.

17. The vehicle of Claim 15, wherein the longitudinal footprint length of the vehicle is equal to or less than 95 inches.

* * * * *